United States Patent [19]

Kabra et al.

[11] Patent Number: 6,030,442
[45] Date of Patent: *Feb. 29, 2000

[54] MICROPOROUS FAST RESPONSE GELS AND METHODS OF USE

[75] Inventors: Bhagwati G. Kabra, Fort Worth, Tex.; Stevin H. Gehrke, Cincinnati, Ohio

[73] Assignee: University of Cincinnati, Cincinnati, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/737,404

[22] PCT Filed: May 13, 1994

[86] PCT No.: PCT/US94/05400

§ 371 Date: Nov. 8, 1996

§ 102(e) Date: Nov. 8, 1996

[87] PCT Pub. No.: WO95/31498

PCT Pub. Date: Nov. 23, 1995

[51] Int. Cl.$^7$ .................................................. C08B 11/00
[52] U.S. Cl. ................................ 106/162.8; 106/162.82; 536/84
[58] Field of Search .............................. 521/27, 28, 149; 106/162.8, 162.82; 536/84

[56] References Cited

U.S. PATENT DOCUMENTS

| | | | |
|---|---|---|---|
| 2,738,857 | 3/1956 | Drew | 183/114.2 |
| 3,920,588 | 11/1975 | Traubel | 521/159 |
| 4,113,912 | 9/1978 | Okita | 428/290 |
| 4,302,553 | 11/1981 | Frisch et al. | 525/28 |
| 4,448,922 | 5/1984 | McCartney | 524/501 |
| 4,661,099 | 4/1987 | von Bittera | 524/724 |
| 4,683,258 | 7/1987 | Itoh et al. | 524/434 |
| 4,732,930 | 3/1988 | Tanaka et al. | 524/742 |
| 4,902,413 | 2/1990 | Stout | 521/56 |
| 4,943,618 | 7/1990 | Stoy | 525/329.1 |
| 4,975,375 | 12/1990 | Haruta et al. | 435/482 |
| 5,011,644 | 4/1991 | Haruta et al. | 264/184 |
| 5,049,275 | 9/1991 | LaForce | 210/500.27 |
| 5,071,909 | 12/1991 | Pappin | 521/53 |
| 5,100,933 | 3/1992 | Tanaka et al. | 523/300 |
| 5,183,879 | 2/1993 | Yuasa et al. | 528/503 |
| 5,240,615 | 8/1993 | Fishman | 210/651 |
| 5,314,923 | 5/1994 | Cooke | 521/149 |
| 5,403,750 | 4/1995 | Braatz | 525/403 |
| 5,403,893 | 4/1995 | Tanaka et al. | 525/218 |
| 5,506,035 | 4/1996 | Phan | 521/149 |
| 5,534,186 | 7/1996 | Walker et al. | 252/194 |
| 5,565,139 | 10/1996 | Walker et al. | 252/194 |

FOREIGN PATENT DOCUMENTS

| | | |
|---|---|---|
| 213908 | 3/1987 | European Pat. Off. . |
| 61-055180 | 3/1986 | Japan . |
| 62-250940 | 10/1987 | Japan . |
| 1270936 | 10/1989 | Japan . |
| 4-118022 | 4/1992 | Japan . |
| 4-122764 | 4/1992 | Japan . |
| 4-243516 | 8/1992 | Japan . |
| WO 9220324 | 11/1992 | WIPO . |

OTHER PUBLICATIONS

Gehrke, Stevin H., Advances In Polymer Science, 110:81 (1993).
Osada, et al., Scientific American, p. 82, May, 1993.
Kabra, B.G., et al., Polymer, 33(5):990 (1992).
Huang, X., et al., Jour. of Chemical Engineering, 20(2):123 (1987).
Pekarek, K.J., et al., Nature, 367:258 (Jan. 20, 1994).
Kabra, B.G., et al., Abtracts, American Institute of Chemical Engineers, 1991 Annual Meeting, p. 93, Abstract #471.
Kabra, B.G., et al., Abstracts, ACS Cellulose Division, Apr., 1992.
Kabra B. G., Synthesis Structure and Selling Of Microporous Gels Ph.D Dissertation, dated 1993 on cover.
Kabra, B. G., et al., Polymer Communications, 32:322 (1991).

*Primary Examiner*—Paul R. Michl
*Attorney, Agent, or Firm*—Frost & Jacobs LLP

[57] ABSTRACT

A microporous, cross-linked, reversibly responsive gel obtainable from a polymeric precursor is disclosed. The microporous gels exhibit a volume change response on the order of seconds, many times faster than nonporous volume change gels of similar dimension. A method of making a microporous, fast response and reversibly responsive gel having a defined pore size and defined strut thickness is also disclosed. The method comprises preparing a polymer solution having a certain initial concentration of polymer precursor, initiating phase separation of the polymer to produce a phase separated state; cross-linking the polymer in its phase separated state or cross-linking the polymer prior in its phase separated state, or both prior to and during its phase separated state, for a certain cross-linking reaction time; and allowing gelation to be completed. Particular uses of the fast response gels are also described. In one embodiment, a method for purifying and concentrating a solute from a solution is described. The method includes the steps of contacting a solution containing the solute with the microporous gel of the invention. Next, the gel is swollen to absorb a portion of the solution and exclude the solute by initiating expansion. This results in a concentrated solution of solute and microporous gel swollen primarily with solution lacking solute.

14 Claims, 7 Drawing Sheets

MICROPOROUS FAST RESPONSE GELS AND METHODS OF USE

BACKGROUND OF THE INVENTION

Volumetric change phenomena have been observed in permanently crosslinked polymer gel networks. As an external environmental condition (e.g., temperature; solvent composition; pH, electric field; light intensity and wavelength; pressure, ionic strength) is changed, the polymer network contracts and/or expands in volume. The volume of such a gel may, under certain circumstances, change reversibly by a factor as large as several hundred when the gel is presented with a change in external conditions (i.e., the gel is a "responsive" gel). Tanaka, Physical Review Letters, Vol. 40, no. 12, pp. 820–823, 1978 and Tanaka et al, Physical Review Letters, Vol. 38, No. 14, pp 771–774, 1977; Tanaka et al Physical Review Letters 5, Vol 45, pg. 1636, 1980; Ilavsky, Macromolecules, Vol. 15, pg. 782, 1982; Hrouz et al, Europ. Polym. J., Vol. 17, pg. 361, 1981; Ohmine et al, J. Chem. Physics, Vol. 8, pg. 6379, 1984; Tanaka et al, Science, Vol. 218, pg. 462, 1972 and Ilavsky et al, Polm. Bull. Vol. 7, pg. 107, 1982, all of which are incorporated herein by reference.

In gels that are conventionally made by copolymerization/cross linking reactions, such as gels comprising poly(N-isopropylacrylamide)(PNIPAAm), the temporal rate of volume change is very slow. This is because the volume change kinetics of these gels are usually controlled by diffusion of the polymer network through the solvent, a very slow process. For example, a sheet of PNIPAAm gel 1mm thick swells or shrinks to equilibrium in a few hours. See Kabra et al., Polymer, 33: 990–995 (1992), incorporated herein by reference. Of course, volume change gels can be made very thin or as extremely small beads, on the order of microns, and the gels will respond very quickly to a change in external stimulus such as temperature. See, for example U.S. Pat. No. 5,183,879. This is because their volume change is controlled by the rate of heat transfer through the gel. However, very thin responsive gels are impractical for any uses that require strength and structural integrity, such as for example, bioreactors, drug delivery systems, mechanico-chemical actuators, and the like.

Only a few attempts have been made to synthesize larger gels having volumetric changes measured on short time scales. See, for example, Huang et al. (J. Chem. Eng. Japan, 20: 123–128, 1987) who analyzed the kinetic behavior of a polyvinylmethylether (PVME) gel made by the gamma radiation, free radical cross-linking of a PVME solution mixed with ferric oxide powder.

This radiation cross-linking method has been critically investigated by Kabra et al., supra who found that the radiation cross-linking method is problematic. Many of the PVME gels made by Kabra et al. had bubbles in them, formed from the hydrogen gases generated during gamma-irradiation. Moreover, although their gels were chemically indistinguishable from those of Huang et al., the Kabra et al. gels that showed the most consistent kinetics were still much slower than the identically made gels of Huang et al.

Significantly, the radiation cross-linking method produced some gels that displayed volume kinetics no different than conventionally-made responsive gels. Moreover, the radiation cross-linking method produced gels with pore sizes consistently greater than 10 microns.

The problems with radiation cross-linking were partially circumvented by synthesizing a microporous gel of cross-linked monomeric N-isopropylacrylamide (NIPA) using a method in which the solution temperature was increased above the lower critical solution temperature (LCST) during the polymerization/cross-linking reaction. Kabra and Gehrke, Polymer Comm. 32: 322–323, 1991. The NIPA gels made by cross-linking monomeric units in this manner displayed an absolute magnitude of volume change (ratio swollen/collapsed=2:1) that was much less than the absolute magnitude of volume change displayed by conventionally-made NIPA gels (ratio=10:1). Significantly, however, monomer reactions are difficult to control, especially during phase separation and many of the gels were structurally weak and were not self-supporting. That is, they deformed under gravity and could not maintain their structural integrity and dimensions when removed from the solvent. Formation of gels from monomeric precursors is also inappropriate for making gels from cellulose ethers, polypeptides, polysaccharides, and other natural materials.

The relationship between synthesis conditions, structure and properties of microporous responsive gels remains unexplored and the rules governing synthesis of fast response microporous gels with predictable structure and response kinetics are not well characterized. It is not yet possible to predict with any certainty if a microporous gel will be a rapid response gel. Mere knowledge that a microstructure exists is insufficient to predict that a given responsive gel will have rapid and consistent volume change kinetics.

SUMMARY OF THE INVENTION

The present invention is a microporous responsive gel obtainable from a polymeric precursor. The microporous gels are sufficiently flexible so as to exhibit a reversible volume change response.

Preferably, the microporous gel is obtainable from a crosslinkable precursor that is capable of undergoing a phase separation, in particular a temperature-induced phase separation. Preferred precursors exhibit a lower critical solution temperature in aqueous solutions, although precursors may also show an upper critical solution temperature. A preferred precursor is a linear polymer, such as a cellulose ether selected from the group consisting of methylcellulose, hydroxypropylmethycellulose, hydroxypropylmethylcellulose, carboxymethylcellulose and hydroxymethylcellulose.

The microporous gels of the invention may be made in a wide variety of sizes (pore size from 0.005 to 50 microns; porosity from 0.1 to 0.95; strut thickness from 0.005 to 50 microns. Preferred gels have a pore size ranging from about 0.03 to 9.0 microns, a porosity ranging from about 0.1 to about 0.7, a strut thickness ranging from about 0.1 to about 18 microns, and may have interconnected or partially interconnected pores. These gels are particularly advantageous in a variety of applications requiring a fast volumetric change. Microporous gels of the invention that are about 1 mm thick are capable of reaching about 90 percent of maximum volume change in about 15 to 20 seconds. In general, microporous gels of the present invention reach 90% of their maximum volumetric swelling or 90% of their minimum volumetric collapse in a time that is at least ten times faster than a comparable non-porous gel of the same geometry when both gels are subjected to a similar change in an environmental condition.

One method of making a microporous gel of the invention having a defined pore size and defined strut size, comprises preparing a polymer solution having a certain initial concentration of polymer precursor; initiating phase separation of the polymer to produce a phase separated state; crosslinking the polymer in its phase separated state for a certain crosslinking reaction time; and allowing gelation to be completed. Crosslinking in the homogenous polymer solution prior to phase separation is not an absolute requirement of this method, particularly if cross-linking is initiated external to the polymer solution, i.e., by way of photochemical cross-linking. Particularly preferred are methods in which the crosslinking is chemical crosslinking and crosslinking is performed prior to phase separation. Most preferably, the step of initiating phase separation includes increasing temperature of the polymer from below a Lower Critical Solution Temperature (LCST) to above the LCST. Also preferred are methods, particularly useful when the polymer is dissolved in an organic solvent, in which the step of initiating phase separation includes decreasing temperature of the polymer from above an Upper Critical Solution Temperature (UCST) to below the UCST. Other methods of inducing phase separation include contacting the polymer phase with a non-solvent for the polymer.

Further methods involve use of design rules for preparing microporous gels with a defined microstructure of sufficient flexibility to ensure that the gel is capable of undergoing reversible volume changes in response to one or more environmental triggers. A method of making a plurality of microporous, responsive gels, includes (i) preparing a polymer solution having a certain initial concentration of polymer precursor;(ii) initiating phase separation of the polymer to produce a phase separated state; (iii) crosslinking the polymer prior to, and during, its phase separated state for a certain crosslinking reaction time; (iv) allowing gelation to be completed; and (v) adjusting at least one variable selected from the group consisting of initial polymer concentration, crosslinking reaction time prior to phase separation, and crosslinking reaction time during phase separation. Steps (i)–(iv) are then repeated so that a plurality of microporous responsive gels are formed.

In particular, if the initial polymer concentration is increased, the resulting microporous gel has decreased porosity relative to a microporous gel in which the initial polymer concentration is not increased. If the crosslinking reaction time prior to phase separation is increased, the resulting microporous gel has a pore size and strut thickness that are decreased relative to a microporous gel in which the crosslinking reaction time prior to phase separation is not increased. If the crosslinking reaction time during phase separation is increased, the resulting microporous gel has pores that are more interconnected relative to a microporous gel in which the crosslinking reaction time during phase separation is not increased. Other variables that may be altered include: (i) increasing the concentration of crosslinker; (ii) increasing the reaction catalyst, if any, which would alter the rate of crosslinking relative to the rate of phase separation; (iii) increasing the rate and extent of phase separation, which would alter the rate of crosslinking relative to the rate of phase separation as well as possibly altering the type of phase separation which could alter the microstructure; and/or (iv) altering the solvent.

Particular uses of the fast response gels are encompassed within the scope of the invention. In one embodiment, a method for purifying and concentrating a solute from a solution is described. The method includes the steps of contacting a solution containing the solute with the microporous gel of the invention. Most preferably, the size of the solute is greater than the pore size of the gel. Next, the gel is swollen to absorb a portion of the solution and exclude the solute by initiating a volumetric change (i.e., expansion). This results in a concentrated solution of solute and microporous gel swollen primarily with solution lacking solute. The concentrated solution of solute is separated from the swollen gel and the swollen gel is washed to yield a wash solution that is optionally combined with the concentrated solution of solute. Optionally, a volumetric change (i.e., a collapse) of the gel is initiated to release a portion of the absorbed solution and the collapsed gel is separated from the released solution. Repeating this procedure several times results in the concentration and purification of the solute originally present in the solution. This procedure may generally be used to exclude dissolved solutes or suspended particles, for example, in the dewatering of slurries.

The present gels may also be used in an apparatus for removing vapor from a gas stream. The apparatus includes a housing adapted for movement from a first position, where it is exposed to the gas stream and to a first environmental condition, and then to a second position, where it is exposed to a second environmental condition. Also included is a means for moving the housing from the first to the second position. A microporous, fast response, crosslinked gel of the invention is disposed on at least one surface of the housing, the gel capable of sorbing vapor from the gas stream as liquid when the housing is in the first position and capable of disgorging the liquid when the housing is in the second position. A method of extracting vapor from a gas stream includes providing a microporous, fast response, crosslinked gel of the invention and exposing the gel to vapor and to an environmental condition sufficient to cause the gel to expand and sorb vapor as liquid. The gel containing liquid is then exposed to conditions sufficient for it to collapse and disgorge the liquid from the gel. The disgorged liquid is removed from the gel.

It is therefore an object of the present invention to provide a polymeric gel that undergoes reversible volumetric changes in a time that is on the order of seconds.

It is a further object of the present invention to provide a method of making a microporous, fast response gel that enables precise control over the microstructure of the gel.

It is another object of the present invention to provide a fast, reversibly responsive gel that may be used with a wide variety of polymers.

L=initial sample thickness.

Figure 9:
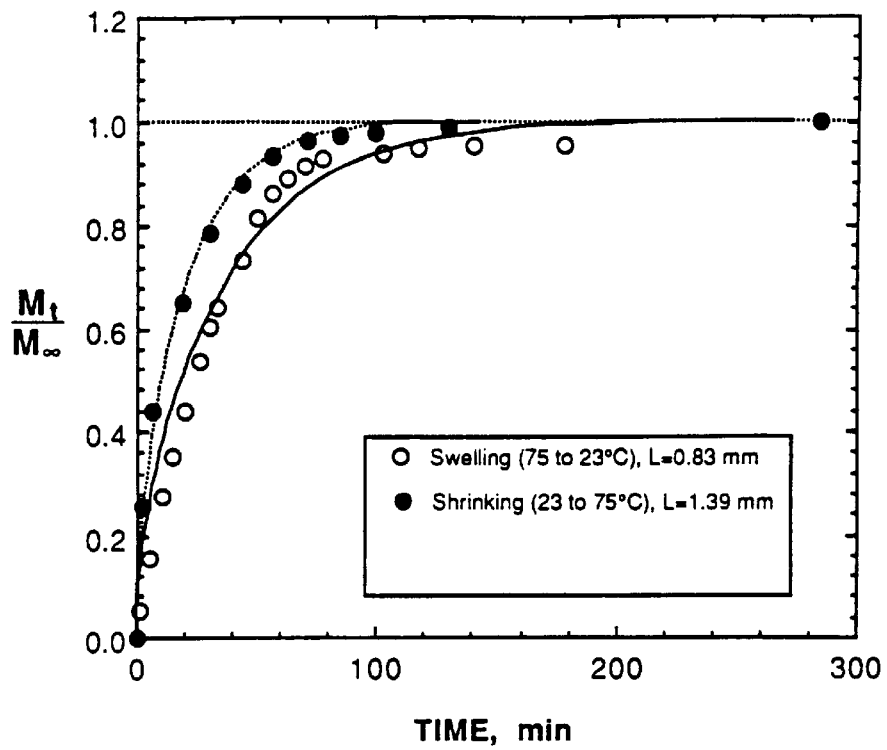

FIG. 9 is a graph illustrating the reversible volume change kinetics of gel P69 having small pores (0.03–0.15 microns) and a microstructure intermediate between microporous and non-porous. L=initial sample thickness.

Figure 10:
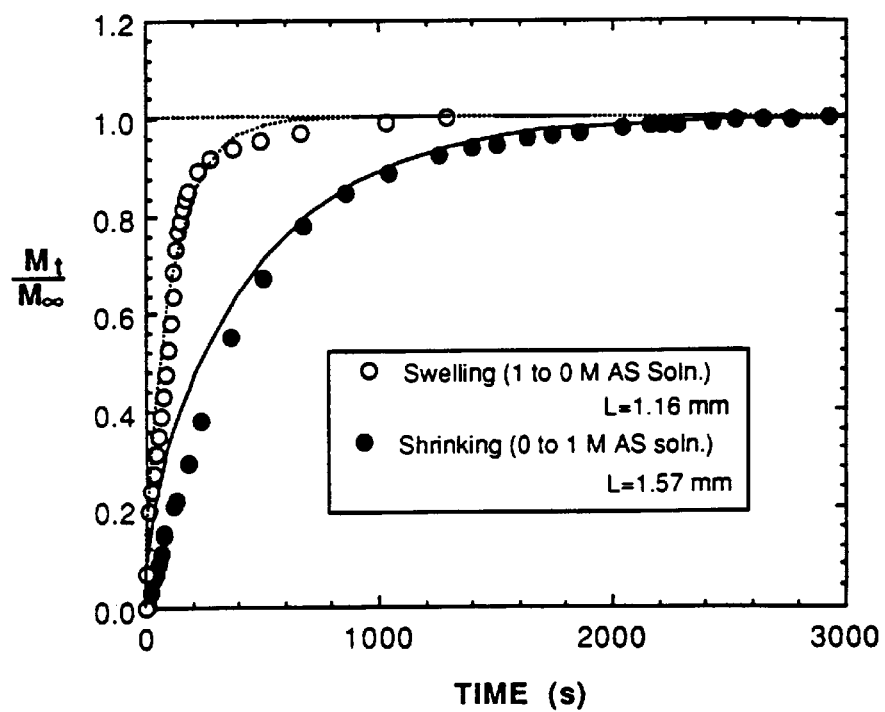

FIG. 10 is a graph illustrating the reversible volume change kinetics of gel P46 in response to a change in ionic strength from 0 to 1 M ammonium sulfate.

Figure 11:
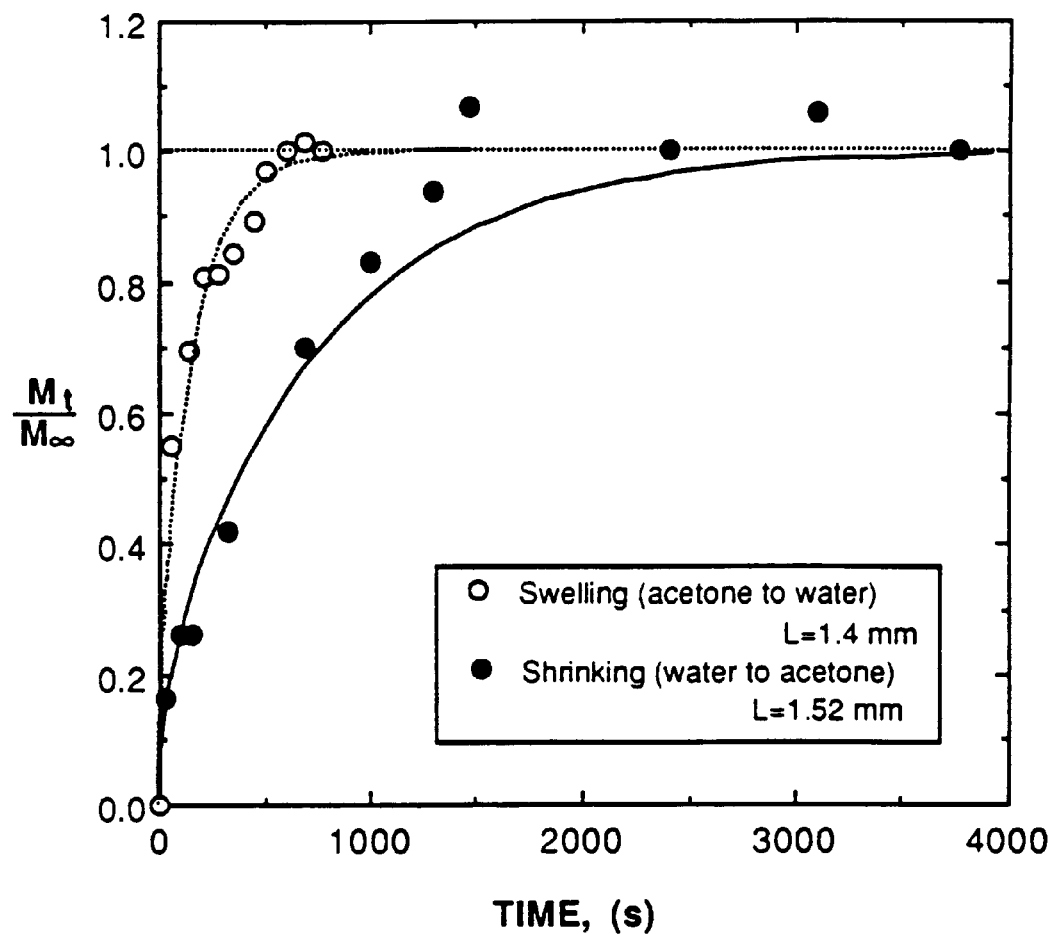

FIG. 11 is a graph illustrating the reversible volume change kinetics of gel P46 in response to a change in solvent concentration from 0 to 1 M acetone.

DETAILED DESCRIPTION OF THE INVENTION

The present invention is based on the discovery of the relationship between synthesis and structure of microporous reversible volume change gels. Applicants have also discovered that synthesis conditions affect the volumetric change kinetics of gels by affecting gel microstructure. Applicants have further discovered that it is this microstructure, not the particular chemical composition of the gel, that affects the response rate.

I. MICROPOROUS VOLUME CHANGE GELS

A. Microstructure

One aspect of the invention is a microporous, crosslinked, reversibly responsive gel obtainable from a polymeric precursor. Responsive gels of the invention may be made by physically crosslinking polymeric precursors. For example, polyvinyl alcohol and polyacrylic acid interact via extremely strong, non-covalent bonding that is essentially irreversible. Responsive gels may also be made by photochemical crosslinking such as exemplified by use of ultraviolet light. Preferred are chemically crosslinked polymeric precursors. "Chemically crosslinked" means that a chemical reagent is added during synthesis which reacts with two or more polymer chains. The term "crosslinked" is meant to specifically exclude gamma radiation crosslinking but is meant to include photochemical, electron beam, or ultraviolet crosslinking. The term "precursor" refers to one or more polymeric starting materials, derived from either naturally-occurring materials (i.e., cellulosics, proteins) or synthetic (non-naturally occurring) materials. The term "microporous" refers to two-phase systems of a continuous solid phase containing numerous pores filled with fluid. A "microstructure" as defined herein, refers to those structures of a gel (e.g., pores, voids, walls and the like)observable under a scanning electron, or other, microscope and ranging in size from 0.01 to about 100 microns.

Preferred gels containing pores in the size range 0.01 to about 10 microns are 'microporous'. If some of the pores are interconnected, the gel is typically called an "open-cell" gel. If all the pores in the gel are interconnected to each other, the gel is a "bicontinuous" gel. If the pores are discrete (not connected to each other), so that the internal space of each pore is independent of the other pores, the gel is a "closed-cell" gel. The present invention encompasses as all these morphological forms and combinations of these forms.

Methods of the invention are designed to provide precise control of gel microstructure, such as strut thickness and pore size. The term "strut thickness" refers to the thickness of the divisions between adjacent pores, "pore size" refers to the average diameter of pores.

B. Function

The present gels are materials between the liquid and solid state, consisting of a cross-linked network of long polymer molecules. The gels are "reversibly responsive", i.e., when challenged with an environmental change, the environmental change affects the gel by causing the entire gel, or a component thereof, to undergo a reversible volumetric change. It is preferred that the gel undergo a reversible volumetric change of at least 20 percent in response to a change in an environmental condition, in which the gel expands from a less liquid-filled state or dry state to a more liquid-filled state; or collapses from a more liquid-filled state to a less liquid-filled state. The reversible volume change involves a shift between two equilibrium states (i.e., swollen and collapsed).

Methods of the present invention result in the consistent production of a "fast response" gel. As defined herein, "fast response" means that the gel reaches 90% of its maximum volumetric swelling or 90% of its minimum volumetric collapse in a time that is at least ten times faster than a comparable non-porous gel of the same geometry when both gels are subjected to a similar change in an environmental condition.

The primary requirement of a gel of the invention is that the entire gel, or its reversible volume change component, undergo a fast volume change. The gel as a whole must meet these requirements. Nevertheless, the gel may itself include several other components as long as at least one component (s) provides the required property.

For instance, the gel may be a single material such as a single polymer network which meets the fast response requirement. The gel may also include two or more components, each component having a different required property. For example, a co-polymer gel may be fabricated in which one component has a high bioactive compound sorptive capacity; the other component having the volume change property that is quickly responsive to an environmental condition. A primarily sorptive-type gel may also be made in the presence of a fast volume change gel.

The fast response gel may also be an interpenetrating polymer network (IPN) in which at least one polymer interpenetrates at least another polymer. An IPN may possess only a fast volume change property such as an IPN of poly-N isopropylamide. A fast response IPN gel may also be combined (e.g. co-polymerized) with a sorptive-type gel to meet the requirements of vapor extraction, drug delivery, or other delivery system. A purely fast response IPN may itself be combined in an IPN with a "sorptive" component. The IPN may possess both properties, however, so that one polymer member of the IPN provides the sorptive property and the other polymer member provides the fast volume change property. This type of configuration is particularly useful in dehumidification/vapor extraction processes.

The reversible volume change of the entire gel, or a component thereof, may be either continuous or discontinuous. A "continuous" volume change is marked by a reversible change in volume (i.e. a collapse or swelling) that occurs over a relatively large change in environmental condition. Moreover, there exists at least one stable volume near the transition between the swollen and collapsed states.

Fast response gels of the invention may undergo a "discontinuous" volume change in which the reversible transition from swollen to collapsed states, and back again, occurs over an extremely small change in environmental condition, such as less than 0.1 degree C or 0.1 pH unit. Such reversible gels are hereinafter called "phase-transition" gels. There is no stable volume between the swollen and collapsed states at the phase-transition and, in theory, the expansion and/or collapse occurs over an infinitely small environmental change. A gel undergoing a continuous phase-transition may have a similar order of magnitude total volume change as a gel undergoing a discontinuous phase-transition.

On a molecular level, the preferred fast response phase transition gels are sensitive to small changes in a restricted repertoire of environmental "trigger" conditions consisting primarily of temperature. Trigger conditions are not so limited, however, and may also include pH, solvent concentration, and ion concentration.

On a macroscopic level, any of a variety of environmental conditions may be imposed on the gel which allows the specific trigger to induce a phase-transition. These environmental conditions may, but not necessarily, be the same as the trigger and include, but are not limited to, a change in temperature, electric field, photon energy, pH, solvent composition, ion concentration, concentration of biomolecules, pressure, and the like.

The gels of the invention may be combined with a material that acts as a molecular "transducer", converting an environmental condition into an appropriate trigger. For example, a dye may be introduced into a temperature-triggered fast response gel. The dye is designed to absorb light of a given energy and convert the light energy into heat, thus triggering the gel to undergo a temperature induced rapid phase-transition. See also, A. Suzuki and T. Tanaka, Nature: 346: 6282 (1990), incorporated herein by reference.

The volumetric changes of gels described herein result from competition between intermolecular forces, usually electrostatic in nature, that act to expand the polymer network; and at least one attractive force that acts to shrink it.

Volumetric changes in aqueous gels are driven primarily by four fundamental forces: ionic, hydrophobic, hydrogen bonding and van der Waals bonding interactions, either alone or in combination. Each of these interactions may be independently responsible for a volume transition in preferred gels of the invention. Each of these fundamental forces is most strongly affected by a particular trigger. Changes in solvent concentration most strongly affect the van der Waals interaction; changes in temperature most strongly affect hydrophobic interactions and hydrogen bonding; and changes in pH and ion concentration most strongly affect ionic interactions.

Thus, a gel whose volume change is governed by ionic interactions would include components that are weakly acidic and weakly basic, such as poly(acrylic acid)/poly(methacarylamidopropyltrimethylammonium chloride [MAPTAC])/water; poly(acrylic acid)/poly(allylamide)/water, and the like. Gels of this type are sensitive to pH.

Gels whose volume change is governed by hydrogen bonding will collapse with a decrease in temperature and are exemplified by interpenetrating polymers that comprise poly(acrylic acid) as one polymer, poly(acrylamide) as the other polymer, and water as the liquid medium. Gels whose volume change is governed by hydrophobic interactions will collapse when challenged with an increase in temperature and are exemplified by poly(N-isopropylacrylamide:NIPA). Gels whose volume change is governed by van der Waals interactions will behave similarly to those governed by hydrophobic interactions and are exemplified by polyacrylamide gels.

Gels may be formulated in which the volume change is governed by more than one fundamental force. In particular, gels consisting of copolymers of positively and negatively charged groups meet this requirement. In these gels, polymer segments interact with each other through ionic interactions and hydrogen bonding. The combination of these forces results in the existence of several pH-driven phases. See Annaka and Tanaka, Nature 355: 430–432 (1992), incorporated herein by reference. An exemplary gel of this type is a copolymer of acrylic acid and methacryl-amidopropyl-trimethyl ammonium chloride (MAPTAC).

Volumetric changes in gels can be derived from their equations of state that relate three characteristic state variables of the gel: volume (V) or equivalent density of the polymer network ($\phi$), temperature (T) plus polymer-solvent interaction parameter ($\Delta F$), and the osmotic pressures ($\pi$). At equilibrium, the osmotic pressure of a gel must be zero ($\pi=0$).

Without wishing to be bound by any particular theory, and as but one example of the theories developed in the field, one may determine the temperature (Tc) of the phase transition where ($\theta$) is the theta temperature of the polymer network in the solvent, and $\phi_0$ is the concentration of the polymer network when in a random walk configuration, using equation 1.

$$T_c = \theta/(1 \pm 22.5\phi_0) \quad \text{(Equation 1)}$$

Figure 3:
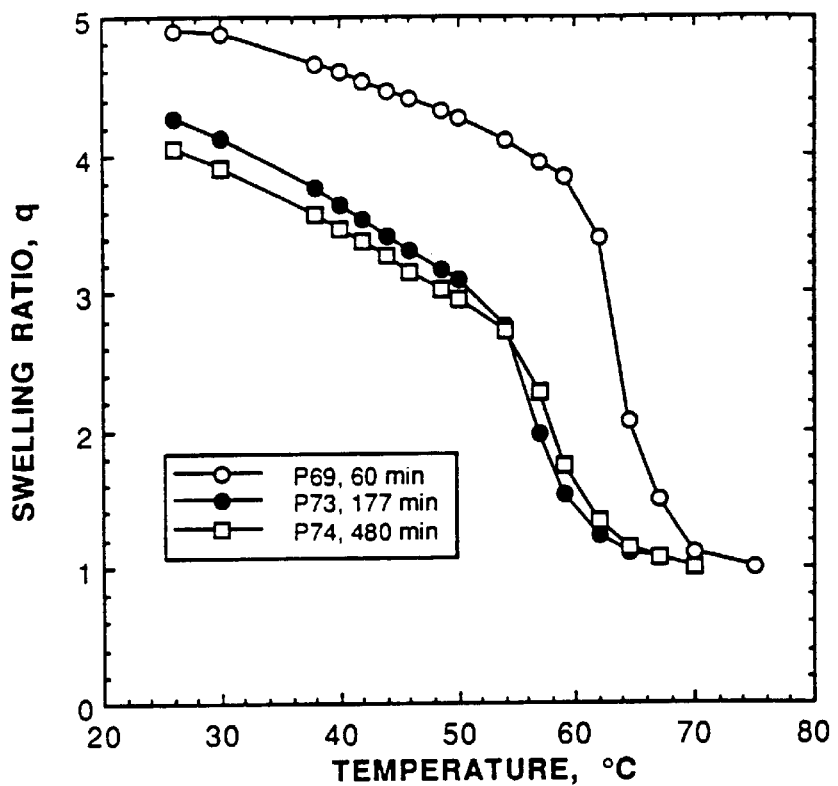
FIG. 3 is a graph illustrating the equilibrium swelling ratio as a function of temperature of microporous gels with crosslinking reaction times before phase separation greater than gelation times.

The sign in the denominator is plus for gels which collapse at lower temperature (see FIG. 4 and Example 4) and minus for gels which collapse at higher temperatures (see FIG. 3 and Examples 1 and 2).

Three osmotic pressures contribute to the total osmotic pressure of a gel, as shown below in equations 2, 3, 4 and 5.

$$\pi = \pi_{rubber} + \pi_{affinity} + \pi_{ion} \quad \text{(Equation 2)}$$

$$\pi_{rubber} = v_o kT\{(\phi/2\phi_o) - (\phi/\phi_o)^{1/3}\} \quad \text{(Equation 3)}$$

$$\pi_{affinity} = v_o kT\{\ln(1-\phi) + \phi\} + \Delta F(\phi/\phi_o)^2 \quad \text{(Equation 4)}$$

$$\pi_{ion} = v_o kT\{(\phi/\phi_o)\} \quad \text{(Equation 5)}$$

Here, $V_0$ denotes the number of effective crosslinks of the network when it is in the random walk configuration whose density is denoted by $\phi_0$. This state is referred to as the reference state. The rubber elasticity, $\pi_{rubber}$, which originates from the configurational entropy of the polymer network, provides a restoring pressure back to the reference polymer network density. When a polymer network is expanded, a negative pressure is created in the network and its shrinks back. On the other hand, when it is contracted, the pressure acts to expand to the original reference state. Secondly, the polymer-polymer and polymer-solvent interactions give rise to another osmotic pressure, $\pi_{affinity}$. In a poor solvent, the polymer network tends to shrink, whereas in a good solvent a gel tends to swell. The last factor is the osmotic pressure due to ionization of the polymer network, $\pi_{ion}$. The counter-ions within the gel create a gas-type pressure to expand the gel in proportion to the density of counter-ions as well as the absolute temperature, kT, where k is the Boltzmann constant.

These three osmotic pressures compete with each other and the gel volume is equilibrated in a condition at which these three osmotic pressures balance at $\pi=0$. There is a special condition at which the competing pressures become equal to each other, at which point the transition occurs.

When the ionization pressure is large, as in the case of extensively ionized gels, the volume transition is drastic and discontinuous. With increased ionization, the volume change at the transition becomes large. There exists a minimum critical concentration of ionic component within a gel sorbent for each solvent system employed in order to achieve reversible discontinuous volume change of the gel sorbent. This minimum ionic concentration can be determined for each polymer network and solvent system.

The equations above qualitatively explain all of these aspects of volumetric changes. See T. Tanaka, D. J. Filmore, S -T. Sun, I. Nihio, G. A. Swislow, and A. Shar, *Phys. Rev. Letters,* 45 1636 (1980) and U.S. Pat. No. 5,100,933 (Tanaka et al.), incorporated herein by reference. See also, S. H. Gehrke, *Adv. Polymer Science* 110:81–144 (1993), for other theoretical descriptions.

II. METHODS OF PREPARING GELS

Several techniques may be used to make the microporous, gels of the present invention. In one method, a gas phase is dispersed throughout a fluid polymer phase and the resulting porous material is solidified. In such microporous materials, the cell or pore size is generally of the order of 100–200 microns or larger. See Aubert et al., Macromolecules, 21: 3468 (1988), incorporated herein by reference.

Another method is to disperse solid particles in a polymer melt or in a polymer solution. The polymer solution or melt is solidified either by chemical crosslinking or by physical means such as freezing. After solidification of the polymer, the solid particles are leached away. See Mikos et al, Mater. Res. Soc. Symp. Proc., 252, pp. 353–358 1992., incorporated herein by reference.

Microporous gels may also be formed by a process in which comonomers including crosslinker are polymerized in one phase of a bicontinuous microemulsion, while the other phase forms the cells or pores. See Hainey, et al., Macromolecules, 24: 117–121 (1991), incorporated herein by reference. Materials made by this process have a pore size ranging from 1–30 microns. This technique is limited by the ability to find a suitable solvent and non-solvent for the comonomers and emulsifying agent which will form a bicontinuous emulsion.

The preferred process for making gels of the present invention and for developing design controls that regulate the microstructure of the final product, is the phase inversion process. "Phase inversion", hereinafter called "phase separation", refers to the process by which a polymer solution containing one or more polymer precursors, in which the solvent is the continuous phase, inverts into a three-dimensional network or gel where the polymer(s) are now the continuous phase. Phase separation occurs when polymer becomes insoluble in the solvent upon changing the system conditions. See Kesting, "Synthetic Polymeric Membranes: A Structural Perspective", J. Wiley and Sons, NY, 1985, incorporated herein by reference. Thus, one method of the invention includes contacting a dissolved polymer with another solvent that effectively removes the solvent from the polymer and precipitates the polymer out of solution, forming a microporous interconnected structure that is crosslinked to convert it into a responsive gel.

Most preferred are methods in which temperature induces phase separation. These processes use a substance that is a solvent for the polymer at one temperature, but is a nonsolvent at another temperature. Temperature may be easily controlled so that this method generally is reproducible, since heat transfer is much faster than mass transfer.

The preferred method described herein for making microporous, fast response volume change gels can be applied to make crosslinked microporous gels from any crosslinkable polymer-solvent system which phase separates with changes in temperature. Many aqueous-soluble polymers phase separate with changes in temperature. Even aqueous polymer solutions which don't phase separate at a particular temperature can be forced to phase separate at another temperature by adding, for example, an organic solvent such as ethanol or a suitable salt, such as for example 1M NaCl (see below).

Phase-inducing means are not limited to temperature. Phase separations may also be induced by altering any of the four, fundamental forces described above to reduce the solubility of the polymer. For example, changing ionic interactions to nonionic interactions will reduce solubility of the polymer; disrupting hydrogen bonding of the polymer with the solvent will reduce the solubility; strengthening the hydrophobic attraction for the polymeric groups will also cause phase separation; altering Van der Waals interactions (e.g., adding NaCl) will reduce solubility of the polymer.

Based on the considerations described herein, preferred starting materials ("precursors") that are to be used to make the fast response gels of the present invention should: (i) be at least able to form an aqueous solution that can be separated into at least two continuous phases upon an environmentally-induced phase separation, most preferably a temperature-induced phase separation; (ii) be easily crosslinkable in the phase separated state in order to preserve the porous morphology; and (iii) be capable of undergoing volume change via swelling and/or collapse.

Based on the foregoing remarks, one of ordinary skill in the art can, for instance, select a particular polymeric precursor for use in the present method by reviewing the readily available literature on temperature-solubility data for various polymers in particular solvents and picking a polymer that precipitates with a change in temperature. Alternately, one could take a given linear polymer, heat the polymer solution over an appropriate temperature range and observe precipation by looking for cloudiness in the solution. Once identified, one finds a crosslinker that will work to link the polymer chains in that solution.

Phase separation may be conveniently induced by lowering the temperature of the polymer/organic solvent system if the polymer/organic solvent system shows an upper critical solution temperature (UCST). Gelation may then be achieved by solidifying the polymer phase by simply lowering the temperature below the upper critical solution temperature (UCST) or, alternately, below the freezing point of the organic solvent.

In aqueous (e.g. non-organic) solvent systems, however, phase separation may be induced by increasing temperature of polymer solutions for those polymers that show a lower critical solution temperature (LCST), i.e. the polymers are soluble in liquid only at temperatures below a certain temperature called the critical temperature. In the most preferred method, polymerization of an aqueous solution of precursor with a crosslinker is initiated at a temperature below the lower critical solution temperature (LCST) of the precursor. Prior to gelation, the solution is heated to above the LCST to that region of the temperature/composition phase diagram in which the polymer/solvent system becomes unstable and separates into two phases, thus causing microscale phase separation. Continued polymerization locks in the phase-separated microstructure.

The general principles for selecting a polymer which precipitates from aqueous solutions upon warming (i.e. has an LCST) are clearly laid out by L. D. Taylor and L. D. Cerankowski (J. Polymer Science: Polymer Chemistry Edition, Vol. 13, pp. 551–2570, 1975). As a rule, as a polymer that is soluble in water at all temperatures is made increasingly hydrophobic, before complete water insolubility is reached, a range of compositions will be found which will show temperature inverse solubility (i.e. the polymer precipitates upon heating). The more hydrophobic the polymer, the lower the LCST. In general, therefore, hydrophilic polymers are not preferred as fast response gels of the invention, although an important exception are the pH-sensitive polymers.

Vinyl polymers such as polyacrylamides or polyacrylates can be made "increasingly hydrophobic" by copolymerizing a hydrophilic monomer like acrylamide with a comparatively hydrophobic monomer like hydroxypropyl acrylate. Hydrophilic natural polymers like cellulose or linear synthetic polymers like poly (vinyl alcohol) can be made "increasingly hydrophobic" by reaction with chemicals that convert hydrophilic polymeric side groups like hydroxyls to more hydrophobic ones like methoxy or hydroxypropyl.

There is thus an extremely large variety number of polymers which can be made to have an LCST. Furthermore, the LCST for a given polymer can be caused to rise or fall by adding appropriate salts or solvents to the solution. See Taylor and Cerankowski, id. Thus polymers which are soluble at all temperatures in water may have an LCST in a salt or mixed solvent system. For example, hydroxyethyl cellulose (HEC) does not have an LCST in water but will precipitate from a sodium chloride solution upon heating to about 95° C.

A related effect is causing precipitation from solution at constant temperature by adding a solvent or salt to the solution. For example, an HEC solution at 95° C. will precipitate when sodium chloride is dissolved in the solution. Such transitions are discussed in detail by D. W. Urry in Andewandte Chemie International Edition English, Vol. 32, pp. 819–841 (1993). He also provides rules for selecting polypeptides with LCST behavior (these rules are in agreement with the more general ruled cited above).

Thus, all polymers which can be precipitated from solution by changes in the environment, especially temperature or solution composition are suitable for use in the present methods. Note that a polymer which can be caused to precipitate by changing environmental conditions will, when crosslinked, form a gel that is responsive to the same environmental conditions.

Critical to the methods described herein is the regulation of polymerization in a manner that avoids formation of a rigid microstructure, i.e., an inflexible microstructure that will not allow the gel to undergo reversible volume change. In the present method, polymerization is continued for a time and under conditions needed for the gel network to obtain sufficient flexibility to undergo expansion and contraction in response to a changing condition i.e., a reversible volume change. Conditions needed to ensure this flexibility will vary. Nonetheless, using the procedures developed herein, one skilled in the art could test the efficacy of a particular method.

A general protocol for forming a microporous, fast response gel of the present invention using a crosslinkable, linear polymer precursor includes the steps of dissolving dry linear precursor polymer(s) in a suitable aqueous solvent and allowing the precursor polymer(s) and solvent to mix. A crosslinking agent is then added to the precursor polymer solution and the solution and crosslinker are further mixed together. The resulting solution may be poured into a solid mold (i.e., between two glass plates) and the crosslinking reaction carried out over at least two different temperature regimes. The gel solution may also be formed into beads or spheres using crosslinking in a non-solid mold where the reacting solution (polymer precursor, crosslinker and catalysis, if needed) is dispersed in a non-solvent to form a droplet. The solution reacts within the droplet to form a bead. The bead may be heated to induce phase separation to produce gel beads of the invention. In this method, the non-solvent may be considered to be a "mold" for droplets. See, for example U.S. Pat. No. 3,953,360, incorporated herein by reference.

In a preferred sequence, a chemical crosslinking reaction is carried out in the homogenous polymer state at room temperature to form a certain amount of polymer network. Then, the temperature is increased above the phase separation temperature into the unstable region of the phase diagram while the crosslinking reaction is continued. Crosslinking now occurs in the polymer-network phase. Finally, the temperature is decreased back to room temperature. Some remixing of phases may occur if reagent is still available. Total crosslinking time will vary but is generally less than 24 hours. The gel is then removed from its mold, and repeatedly washed to leach out any sol fraction present in the gel. See Example IV.

Nevertheless, cross-linking in the homogeneous state is not essential, particularly if the cross-linking reaction is initiated external to the solution, i.e., via ultraviolet or other photochemical means. Under these circumstances, cross-linking occurs only after phase separation.

A. Precursor Materials

Applicants have discovered that fast, reversibly responsive characteristics are not primarily a function of the chemical nature or chemical composition of polymers, but depend upon gel microstructure which must be sufficiently flexible to allow reversible expansion and contraction in response to an environmental trigger.

In principle, a fast response gel can be made from any responsive polymer with side groups that can react with a di- or multi- functional crosslinking molecule (typically a covalent reaction, but physical interactions can also work).

The easiest systems from which fast-response gels can be made are polymers with hydroxyl, acid or amine side groups and which have LCST's in aqueous solutions together with water-soluble crosslinkers.

Suitable synthetic polymers with LCST's in aqueous solutions include poly(vinyl alcohol-co-vinyl acetate), poly (ethylene oxide-co-propylene oxide), poly(methacrylic acid), cyanoethylated or partially formalized poly(vinyl alcohol), and poly-N-vinyl-2-oxazolidone.

Microporous gels of the invention also may consist, in whole or in part, of polymers made by copolymerization/crosslinking of monofunctional and polyfunctional polymerizable vinyl monomers. Exemplary gels may contain N-alkylacrylamide (or analogous N-alkylmethacrylamide) derivatives like N-ethylacrylamide, N-n-propylacrylamide, N-n-propylmethylacrylamide, N-isopropylacrylamide, N-n-isopropylmethylacrylamide, N-cyclopropylacrylamide, or acrylate (or analogous methacrylate) copolymers like hydroxypropyl acrylate-co-acrylamide, diacetone acrylamide-co-hydroxyethyl acrylate, hydroxypropyl acrylate-co-hydroxyethyl acrylate, ethylacrylamide, cyclopropylacrylamide, n-propylacrylamide, and isopropylacrylamide.

Microporous response gels of the invention are preferably prepared from synthetic starting materials using linear polymers that are capable of being crosslinked. Reversible volume change gels of the invention may be made by crosslinking linear polymers through physical interactions as in the poly(vinyl alcohol)-poly(acrylic acid) or poly (ethylene glycol)-poly(methacrylic acid) systems, in which these hydrophobically modified polyethylene glycols and similar polymers can associate through strong hydrophobic interactions. Charge complexation and hydrogen bonding also works well, particularly for pH-sensitive gels. Examples are poly(ethylene glycol)-poly(methacrylic acid) or poly(vinyl alcohol)-poly(acrylic acid).

Also preferred are natural polymeric starting materials that may be chemically cross-linked. Exemplary polymers that may be conveniently used according to the invention include precursors such as alkyl-substituted cellulose derivatives like cellulose ethers. Exemplary cellulose ethers include methylcellulose, hydroxyethylcellulose, hydroxypropylmethylcellulose, hydroxypropylcellulose, carboxymethylcellulose and hydroxymethylcellulose. Polypeptides like poly(L-proline), and poly(valine-proline-glycine-X-glycine), [where X—tyrosine, phenylalanine, leucine, valine, glutamic acid, lysine, glycine, and other amino acids] may also be used.

Monomer starting materials are suitable although polymer precursors are preferred. When monomeric precursor units are used in the methods of the invention, the polymer is formed simultaneously with polymer crosslinking. Because only the polymer phase separates, one has to generate a critical amount of polymer from the monomeric precursor before the resulting polymer will phase separate. This places constraints upon the control of the polymer network. On the other hand, when one starts with a polymeric precursor, phase separation is possible immediately and one can precisely control the rate of crosslinking relative to the rate of phase separation without having to generate enough polymer network so that phase separation is possible. The NIPA fast response gel whose synthesis from a monomeric precursor was described above, was structurally weak and separated into a milky, flowable latex prior to gelation. See Kabra and Gehrke, supra. It may be that the small NIPA monomers did not grow to a size sufficient enough so that the phases could be linked together when phase separation was induced. As a result, much of the microstructure was lost and latex formed.

B. Cross-linking Agents

The additional requirement for the practice of this invention is that the gel be crosslinkable, preferably chemically cross-linkable. Any reagent which can react with two or more groups on the polymer can function as a crosslinker and convert that polymer to a gel. Polymers with reactive side groups like hydroxyl, amide, or carboxyl will be among the easiest to crosslink (note that these groups are also water soluble groups). It is thus most convenient if the crosslinker is water-soluble.

Cross-linkers suitable for polymeric precursors include acetaldehyde, formaldehyde, glutaraldehyde, diglycidyl ether, divinyl sulfone, diisocyanates, epichlorohydrin, phosphoryl chloride, trimetaphosphate, trimethylomelamine, polyacrolein, and ceric ion redox systems. The concentration of crosslinkable material is generally about 0.1 to about 10 mole percent based upon the polymerizable material which is the main component. The crosslinking agent effects partial crosslinking of the polymer and provides a means to control the gel's mechanical strength, swelling degree, and intensity of volume change trigger by changing the crosslinking density.

C. Catalysts

Polymerization initiators, such as a free radical initiator such as ammonium persulfate or sodium metabisulfite, are usually not required in the present methods.

Catalysts may, however, be required such as hydroxide that will catalyse reactions with polyvinylsulfone.

D. Design Rules

The methods described herein provide a great degree of control over microstructural parameters such as porosity, pore size, strut size and pore interconnectivity.

The porosity of microporous gels with interconnected pores can be decreased by increasing the initial polymer concentration. The pore and strut sizes of microporous gels with interconnected pores can be varied by adjusting the crosslinking reaction time before phase separation. With an increase in the crosslinking reaction time before inducing phase separation, the rate of phase separation decreases due to the resulting increase in the viscosity of the polymer solution. This results in a decrease in the pore and strut sizes with increases in the reaction time. Finally, the nature of the microstructure of the gels, i.e., the interconnectivity of the pores, can be changed by adjusting the reaction time during phase separation. If the reaction time during phase separation is sufficient to lock-in the interconnected morphology, a microporous gel with interconnected pores is obtained. If the reaction time during phase separation is not sufficient to lock-in the interconnected morphology, and allows remixing of phases, gels with partially connected or unconnected pores are obtained. See FIG. 9.

The equilibrium swelling degree of microporous gels with interconnected pores at a given temperature depends upon their porosity. The reaction time during the phase separated state mainly determines the average polymer concentration at the time of polymer network formation. Gels with lower reaction times during phase separation have a lower average polymer concentration at the time of network formation, a lower porosity, and show large swelling ratios. See Example V.

Microporous gels with interconnected pores show faster volume change kinetics than non-porous gels (See Example VII). In contrast, gels with unconnected pores swelled and shrank at rates comparable to non-porous gels (See Example VII). Pores need to be interconnected for a gel to show fast response since there can be no convective flow through unconnected pores. The invention will now be described using the following, non-limiting examples that are presented for illustrative purposes only.

EXAMPLE I

Characterization of Structure

Microscopy: Gel samples were freeze-dried at the Miami Valley Laboratories, The Procter & Gamble Company by Dr. Richard J. Spontak according to the following procedure:

Small pieces (approximately 2 mm×2mm) of gel were cut from a swollen gel sheet using a fresh razor blade. They were blotted on a filter paper to remove excess surface water and were then quickly plunged into liquid ethane cooled by liquid nitrogen. Then specimens were transferred in liquid nitrogen to a solid brass specimen stage, which consisted of nine 3 mm (diameter)×3 mm (depth) holes at the surface. The stage was held in constant contact with liquid nitrogen and, once filled, it was transferred to a JEOL JFD 9000-C freeze fracture/etching unit. All transfers were quick and effectively eliminated substantial frost build-up at the gel surfaces. The stage, once inside the unit, was held at −100° C. A knife block, located above the specimen stage, was held at −164° C. to act as a cold finger and collect contaminants.

Freeze-drying was conducted for 10 hours under the pressure of $3.2 \times 10^{-7}$ torr (obtained with an Edward's residual gas analyzer). After freeze-drying, samples were mounted on SEM stubs using carbon-impregnated (conductive) double-sided tape. Samples were sputter coated with 25 nm of Au—Pd (2.5 mm/min in pulse mode to avoid sample heating) in an Anatech Hummer Nugget operated at $5\times10^{-2}$ torr with an Ar flow.

The microstructure of the freeze dried gels was visualized using a scanning electron microscope. Most of the microscopy was performed on ISI-SX-30 scanning electron microscope of the Department of Chemical Engineering, the University of Cincinnati. Briefly, a sputter-coated freeze-dried gel sample mounted on a SEM stub, was placed in the specimen chamber and a vacuum was established. Then the emission current was manually adjusted until it achieved its maximum value. At a desirable magnification, the picture was focused, and the contrast and brightness were adjusted to the proper value. The micrograph was taken using Polaroid film type 52 or type 55.

The pore size and the strut size range was measured from the scanning electron micrograph of the freeze dried gel using a ruler. All the void spaces (dark areas) were taken as pores. The largest dimension across the pore was taken as the pore size. The pore size range was obtained by measuring the size of the smallest void space and the largest void space. The lighter areas in between the void spaces were taken as the struts. The width (the smaller dimension) of the struts was measured and was taken as the strut size.

Porosity: To measure the porosity of the gel, a gel swollen in water at 25° C. was weighed and was then kept in the middle of 24 layers of the tissue paper (Kimwipes, Kimberly-Clark). A glass slide was kept above the tissue papers and the mechanical force was applied on the glass slide by pressing it with fingers. The force applied on the glass slides was about 25–45 lbs (that is, pressure of about 8–15 psi). Water released by gel under this mechanical force was absorbed by Kimwipes® (Kimberly-Clark, Inc.). This procedure was repeated 3 more times using fresh Kimwipes® until the gel stopped expelling water. Then the weight of the gel was measured. The porosity results obtained using this procedure had ±3% reproductibility.

Measurement of Crosslinkage: The degree of crosslinking of HPC gels was measured from an uniaxial compression test using equipment and techniques described in detail elsewhere (Harsh 1992, "Controlling swelling behavior of cellulose ether hydrogels", Ph.D. Thesis, Univ. Cincinnati incorporated herein by reference). Briefly, a cylindrical gel disk (approximately 25 mm in diameter) was first swollen to equilibrium in water at 25° C. and weight, thickness, and diameter measured using a balance, micrometer, and a ruler, respectively. The gel sample was placed in a water-filled Petri dish and a constant strain was applied by adjustment of a micrometer. The relaxation of the applied stress was monitored by the computer until the equilibrium, relaxed states was reached. Then the strain was increased in steps and equilibrium value of stress at each point was recorded. Next, the equilibrium stress was plotted versus the strain function $(\alpha-\alpha^2)$, where a is the ratio of deformed thickness to the unstrained thickness of the sample. This plot is expected to be linear for $\alpha>0.90$. The shear modulus was obtained from the slope of the initial linear region of the plot using the equations of Mark, Physical Properties of Polymers, Am. Chem. Soc., Wash. D.C.,(1984), incorporated herein by reference.

The crosslink density of the gel sample was calculated from the equations derived by Harsh et al., J. Control. Rel., 1991, for non-porous gels, incorporated herein by reference, e.g.

$$G = RT\, \rho x (\phi 2f/\phi 2)^{2/3} \qquad \text{(Eqn. 4.2)}$$

where:

$\rho x$ is the crosslink density;

$\phi 2f$ is the polymer volume fraction at the network formation; and $\phi 2$ is the polymer volume fraction of the gel during the experiment.

EXAMPLE II

Measuring Swelling Behavior

The equilibrium swelling degree of HPC gels at a given temperature was measured using a gravimetric technique. The gels were swollen for 1–2 days in order for them to reach equilibrium at a given temperature. Attainment of equilibrium was confirmed when no change in the weight of the gel sample was observed with time. The weight of the swollen gel was measured using a Mettler analytical balance (AE 200, accuracy ±0.0001 g) after blotting off the excess solution from the gel surface with Kimwipes. Then the gel was air dried and its dried weight was measured. The equilibrium swelling degree Q was then calculated as ratio of the swollen weight to the dry weight of the gel. The equilibrium swelling degree had a reproducibility of ±5 to 10%.

For gels which showed a volume change temperature, that is, a significant drop in the swelling degree around a certain temperature, the transition temperature was determined using Cricket Graph software (Cricket Software, Malvern, Pa.). The degree of swelling was normalized from 0 to 1 using the following equation:

$$\frac{Q - Q_H}{Q_L - Q_H}$$

where:

Q=equilibrium swelling degree at a temperature T;

QH=equilibrium swelling degree at the highest temperature; and

QL=equilibrium swelling degree at the lowest temperature.

The normalized equilibrium swelling degree was then plotted versus temperature and a third order polynomial is fit to the data. The transition temperature is defined as the point at which the second derivative of this polynomial becomes zero. The sharpness of the transition was defined as the value of the first derivative of the polynomial at the transition temperature.

EXAMPLE III

Measuring Volume Kinetics

Dynamnic Gravimetric Technique: To measure the volume change by the dynamic gravimetric technique, a rectangular gel sheet ranging in thickness from 0.75 to 1.6 mm with a minimum aspect ratio (length to thickness) of 10 was immersed in distilled water in a capped jar at a predetermined temperature and allowed to reach equilibrium. Its equilibrium weight and thickness were noted down. Then it was kept in a temperature controlled water bath (Neslab 220, ±0.1° C.) at another temperature. A Mettler analytical balance (AB 200, precision ±0.0001 g) was used to weigh the sample, and a micrometer (precision ±0.01 mm) was used to measure the thickness of the sample. The rate of weight change of the gel was measured by removing the gel from water at appropriate intervals, quickly blotting the surface water with a Kimwipe® (Kimberly-Clark, Inc.) and weighing the gel. It took about 15 to 30 seconds to blot and weigh the sample. This procedure was repeated until no further appreciable change in the gel weight was observed with time, and the gel sample was assumed to have reached equilibrium at the new temperature.

This technique was used to measure the volume change kinetics of the gels only when the time required to blot and weigh the sample (i.e., time required to take the reading) was much less than the time taken by the gel sample to reach the equilibrium. We also made sure that the blot and weighing times were much smaller than the time interval between the readings. For example, 6–10 readings were taken for a gel which took about 30 minutes to reach the equilibrium. The first reading was taken after about 1 minute. The second and third readings were taken at about 3 and 6 minutes. The gap between readings was increased steadily for further readings. The total time required to take all the readings was always less than 5% of the time required to reach equilibrium. The fractional uptake data obtained using this technique had ±3 to 5% reproducibility. Equilibrium Gravimetric Technique: When the time required to blot and weigh the gel sample is comparable to the time interval between the readings, the dynamic gravimetric technique will fail to give accurate measurements. To overcome this problem, a different method of getting kinetic data from a gravimetric technique was used. The gel was equilibrated at a temperature $T_1$ and its weight and thickness were noted. It was then immersed in water at temperature $T_2$. After a given time t, the gel was removed from the water and weighed after blotting the surface water. After this, the gel sample was returned to the original temperature $T_1$, and was allowed to return to the equilibrium. Its weight and thickness were again measured. Then again the gel sample was kept at temperature $T_2$, and the time before the reading was increased by a small increment. The cycle was repeated, increasing the time spent at $T_2$ each time, until the sample weight becomes independent of time.

This technique is called "equilibrium gravimetric technique" as the sample is equilibrated before each weight measurement. This technique works very well even for gels which took only 15–20 seconds to reach equilibrium. The fractional uptake data obtained using this technique had ±5 to 10% reproducibility.

Videomicroscopy Technique: A videomicroscope system was designed to collect the kinetic volume change data. It has been described in detail elsewhere (Kabra et al., Polymer 33: 990–995, 1992). Briefly, the sample being studied was placed in a Plexiglas® chamber through which water from a temperature controlled bath was continuously circulated. This Plexiglas® chamber was kept on the stage of a stereo microscope (Olympus model SZH-ILLD). Images of the gels were taken using a TV camera (Panasonic) and were sent directly to a Proviz video image digitizer (Pixelogic Inc. Stoneham, Mass.). The digitized images were stored on a Macintosh II computer and analyzed using "Image" image analysis software. The dimension of the gel sample (length and width for a flat sheet and diameter for a cylinder) were measured as a function of time to obtain volume change kinetics. The advantage of the videomicroscopy system is that the sample is not removed from water. Furthermore, the readings can be taken every five seconds. However due to continuous flow of the water around the gel sample, the sample doesn't remain flat, but bends causing larger error in the sample dimensions. Also, many of the samples did not swell isotropically. Thus, this system was used only when the gel couldn't be weighed easily and only when the gel swelled isotropically.

EXAMPLE IV

Preparation of Hydroxypropylcellulose (HPC) Gel

Dry HPC was dissolved in a pH 12.2 NaOH solution in a glass vial. The solution was kept at room temperature for at least 24 hours to ensure good mixing. Divinylsulfone (DVS) was added to the solution by a micropipette at room temperature and was mixed thoroughly for 30 seconds. The solution was poured on a glass plate (6"×6"×0.12") in the center and was then covered with another glass plate. The glass plates were separated by a silicon rubber gasket (1.6 mm thick) and were hold together with book clamps. The crosslinking reaction occurred over 3 different time/ temperature intervals, discussed below.

In the beginning, the crosslinking reaction was carried out in a homogeneous state at room temperature forming a certain amount of network. Then the temperature was increased above the phase separation temperature while the crosslinking reaction continued. Finally, in the third part the temperature was decreased back to room temperature. Some remixing of the phases may occur if reagent is still available. The reaction time in these three steps were denoted as $t_{BP}$, $t_{DP}$ and $t_{AP}$, respectively. The $t_{BP}$, $t_{DP}$ and $t_{AP}$ stand for the reaction times before phase separation, during phase separation and after phase separation, respectively.

The total crosslinking reaction time was generally kept around 24 hours. After that time the mold was opened and the gel sheet was removed. The gel sheet was cut into small rectangular pieces about 25 mm×25 mm. These gel pieces were kept in dilute HCl solution to neutralize NaOH present in them. Then they were repeatedly washed with water to replace dilute polymer phase with water and to leach out any sol fraction present in gel. Gels were not dried further.

EXAMPLE V

Effect of Variables on Gel Microstructure

Effect of Initial Polymer Concentration: In order to vary the microstructural characteristics such as porosity, pore size and strut size, the initial polymer concentration ($C_P$) was varied. The synthesis parameters and microstructural parameters obtained using the experimental procedure described above are summarized in Table 1.

TABLE 1

Effect of Initial Polymer Concentration on Gel Porosity and Pore Size.

Synthesis Parameters

Initial Polymer Concentration, $C_p$ = 9 to 22.6 wt %
Initial Crosslinker Concentration, $C_x$ = 1.3 to 2.1 wt %
Reaction Time Before Phase Separation, $t_{BP}$ = 1.5 to 2.2 minutes
Reaction Time During Phase Separation, $t_{DP}$ = 23 to 24 hours
Reaction Time After Phase Separation, $t_{AP}$ = 0 minutes
Overall Reaction Time = about 24 hours

| Sample | Cp wt % | 100 × Cp/Cx | Porosity | Pore Size Cross- Section micron | Strut Thick- ness micron | Pore Morphology |
|---|---|---|---|---|---|---|
| P24 | 9 | 14.1 | 0.76 | 0.5–9.0 | 1.0–2.0 | Connected |
| P16S1 | 12.8 | 11.8 | 0.69 | 0.5–8.0 | 0.5–2.0 | Connected |
| P20 | 16.4 | 9.42 | 0.54 | 0.2–2.5 | 0.25–1.0 | Connected |
| P38 | 22.6 | 9.42 | 0.23 | 0.2–2.0 | 0.2–2.0 | Connected |

With an increase in initial polymer concentration, we obtained a significant decrease in the porosity of the microporous gel (compare columns 2 and 4 of Table 1). The porosity in these water swollen gels at 23° C. represents the fraction of the volume of the microporous gel occupied with the water filled pores. The porosity of microporous gels decreased from 0.76 to 0.23 with an increase in the initial polymer concentration from 9 to 22.6 wt %. The remaining volume is occupied by the water swollen struts.

According to generally accepted phase rule, at a fixed phase separation temperature, the ratio of the amount of dilute phase to that of the amount of the concentrated phase obtained upon the phase separation will decrease with an increase in the initial polymer concentration. Since the dilute phase forms the water-filled pores and the concentrated phase forms the water-swollen struts, in a water-swollen microporous gel, the porosity of the microporous gel prepared by phase inversion technique is expected to decrease with an increase in the initial polymer concentration. Thus, the trend in the values of porosity with increase in the initial polymer concentration is same as what is expected from the generally accepted phase rules.

The other important characteristics of the gel microstructure are the pore size and the strut size. Both the pore and strut size of the gels obtained from the micrographs are tabulated in Table 1. As the initial polymer concentration increases they reduce slightly (compare columns 2 and 5/6 of Table 1). In all cases, the pores are interconnected.

Thus, by altering the initial polymer concentration, the porosity of the microporous gels can be controlled and the pore size and strut size can be varied slightly while maintaining the pore interconnectivity.

Effect of Reaction Time Before Phase Separation:

With a change in the initial polymer concentration, only a small change was observed in the pore size. In order to get better control over the pore size of the microporous gel, the crosslinking reaction time before phase separation, $t_{BP}$ was varied from 1.5 minutes to 8 hours while keeping all other synthesis variables constant.

TABLE 2

Effect of Reaction Time Before Phase Separation on Pore Size.

Synthesis Parameters

Initial Polymer Concentration, $C_p$ = 9 wt %
Initial Crosslinker Concentration, $C_x$ = 1.4 to 1.6 wt %
Reaction Time Before Phase Separation, $t_{BP}$ = 1.5 to 480 minutes
Reaction Time During Phase Separation, $t_{DP}$ = 19–24 hours
Reaction Time After Phase Separation, $t_{AP}$ = 0 minutes
Overall Reaction Time = about 24 hours

| Sample | $t_{BP}$ min | Porosity | Pore Size Cross-Section µm | Strut Thickness µm | Pore Morphology |
|---|---|---|---|---|---|
| P24 | 1.5 | 0.76 | 0.5–9.0 | 1.0–2.0 | Connected |
| P53B | 2.9 | 0.77 | 0.5–8.0 | 0.5–2.0 | Connected |
| P35 | 8.4 | 0.73 | 0.5–8.0 | 0.5–1.0 | Connected |
| P34 | 15 | 0.72 | 0.25–3.0 | 0.25–1.0 | Connected |
| P70 | 20 | 0.69 | 0.075–0.5 | 0.1–0.2 | Connected |
| P41 | 25 | 0.47 | 0.05–0.2 | 0.1–0.2 | Connected |
| P69 | 60 | 0.08 | 0.03–0.15 | — | Partially Connected |
| P73 | 177 | — | No Pores | — | Non-Porous |
| P74 | 480 | — | No Pores | — | Non-Porous |

With an increase in $t_{BP}$ from 1.5 minutes to 25 minutes, the pore size range dropped steadily from 0.5–9.0 µm to 0.2–0.05 µm, and the strut thickness decreased steadily from 1.0–2.0 µm to 0.1–0.2 µm (Table 2; columns 2 and 5/6). However, the type of microstructure remained the same in that the pores were interconnected in all cases.

This decrease in the pores and struts can be explained as follows: As the crosslinking reaction time before phase separation is increased, the polymer chains are more crosslinked in the homogeneous state. This results in an increase in the viscosity of the solution and a decrease in polymer chain mobility which causes a drop in the phase separation rate at the beginning of phase separation. Furthermore, the rate of phase separation keeps on decreasing as the crosslinking reaction proceeds simultaneously with the phase separation process. Also, the crosslinking of linear polymer chains locks them into the ensuing network. This locking of the polymers chains into the network may restrict the distance a polymer chain can move away from other neighboring polymer chains upon phase separation. As a result, the polymer chains may not move far from each other, resulting in smaller sizes of the concentrated and dilute phases.

Hence smaller pores and struts are observed with increases in the reaction time before phase separation. Thus, the synthesis variable $t_{BP}$ provides a good means of controlling the pore and strut sizes while maintaining the interconnectivity of the pores.

Referring again to Table 2, as $t_{BP}$ is increased to 60 minutes (Gel P69), the polymer solution gels before the beginning of phase separation. When the temperature is increased to the phase separation temperature, the gelled polymer solution shrinks while the crosslinking reaction continues. However, due to continuing crosslinking reaction, the gel doesn't shrink completely, i.e., the gel doesn't shrink as much as a homogeneous gel of that composition would shrink in water at that temperature. This gel (P69) has pores in the size range 0.03 to 0.15 µm. This means that upon temperature increase, this gel undergoes internal phase separation in addition to shrinking. However, the data indicates that pores are not completely connected to each other. This is further confirmed as water present in the pores could not be removed under mechanical pressure (data not shown).

Upon further increasing $t_{BP}$ to 177 minutes (sample P73 of Table 2), the gel shrank much more than gel P69. No pores were observed in gel P73. A similar shrinking of the gelled polymer solution was observed for $t_{BP}$=480 minutes.

The porosity of the gels did not change much with an increase in $t_{BP}$ up to 20 minutes (compare columns 2 and 3 of Table 2), though the pores and struts decreased significantly. After 20 minutes, the porosity decreased and became zero at 60 minutes. The pores and struts can be effectively controlled by varying $t_{BP}$ until gelation occurs while keeping the pore interconnectivity intact. By increasing $t_{BP}$ beyond gelation time, a microporous gel with unconnected pores can be prepared.

Effect of Reaction Time During Phase Separation

We have demonstrated that by changing the initial polymer concentration and the reaction time before phase separation the pore size, strut thickness and the porosity of microporous gels can be effectively controlled. However, in most of these cases the type of microstructure was similar, i.e., the pores were interconnected although some variation in the interconnected structure was obtained by varying the reaction time during the phase separated state, $t_{DP}$.

In all the gels discussed to this point, the reaction in the phase separated state was carried out for about 24 hours, which resulted in the complete preservation of the phase-separated, interconnected domains in the network. Furthermore, in all these cases, the reaction time after phase separation, $t_{AP}$, was kept zero. In order to change the type of structure, the reaction in the phase separated state was carried out for shorter periods. This may not be enough either to allow substantial phase separation or to preserve the interconnected phase domains obtained upon phase separation. After allowing reaction for time $t_{DP}$, the temperature was reversed back to room temperature, well within the homogenous region of the phase diagram. This change of temperature into the homogenous region will tend to cause remixing of the phase separated domains (concentrated and dilute phase). The degree of remixing of the two phases will be inversely proportional to the extent of crosslinking of the polymer chains of the concentrated phase in the ensuing network.

The reaction time before the phase separation, $t_{BP}$, was kept constant at 2.0 minutes and the reaction time during the phase separation, $t_{DP}$, was varied from 1.5 minutes to 5.1 minutes while keeping the initial polymer and crosslinker concentrations constant. After that the crosslinking reaction was carried out at room temperature.

TABLE 3

Effect of Reaction Time During Phase Separation on Gel Microstructure.

Synthesis Parameters

Initial Polymer Concentration, $C_p$ = 9 wt %
Initial Crosslinker Concentration, $C_x$ – 1.4 to 1.6 wt %
Reaction Time Before Phase Separation, $t_{Bp}$ = 1.5 to 2.2 minutes
Reaction Time During Phase Separation, $t_{DP}$ = 1.5 to 1380 minutes
Reaction Time After Phase Separation, $t_{AP}$ = 0 to 24 hours
Overall Reaction Time = about 24 hours

| Sample | $t_{DP}$ min | $t_{AP}$ min | Porosity | Pore Size Cross-Section μm | Strut Thickness μm | Pore Morphology |
|---|---|---|---|---|---|---|
| P45 | 1.5 | 1620 | 0.12 | 3.0–8.0 | 2.0–6.0 | Partially Connected |
| P75 | 3.7 | 1620 | 0.11 | 0.5–10.0 | 0.5–18.0 | Partially Connected |
| P76 | 3.8 | 1600 | 0.11 | 0.5–8.0 | 0.5–20.0 | Partially Connected |
| P44 | 5.1 | 1460 | 0.77 | 1.0–16.0 | 1.0–2.0 | Connected |
| P24 | 1380 | 0 | 0.71 | 0.5–9.0 | 1.0–2.0 | Connected |

The microstructures of gels P45, P75 and P76, are much different from the gels discussed up to this point. There are much fewer pores. Furthermore, most of the pores seem to be dispersed in a continuous solid phase. This indicates lack of complete interconnectivity of the pores. These results were further confirmed by the porosity measurements. Upon application of force, these gels expelled only 11% of their total water. By increasing $t_{DP}$ to 5.1 minutes, we observed a completely interconnected porous structure (Gel P44 in Table 3).

The value of $t_{DP}$ at which unconnected or partially connected pores are observed depends on the value of $t_{BP}$. This was demonstrated by carrying out the reaction for longer and longer periods in the homogenous state before phase separation (see Table 4).

TABLE 4

Effect of Reaction Time During Phase Separation on Gel Microstructure.

Synthesis Parameters

Initial Polymer Concentration, $C_p$ = 9 wt %
Initial Crosslinker Concentration, $C_x$ 1 1.6 wt %
Reaction Time Before Phase Separation, $t_{Bp}$ = 8.9 minutes
Reaction Time During Phase Separation, $t_{DP}$ = 1.7 to 1405 minutes
Reaction Time After Phase Separation, $t_{AP}$ = 0 to 40 hours
Overall Reaction Time = 24 to 40 hours

| Sample | $t_{DP}$ min | $t_{AP}$ min | Porosity | Pore Size Cross-Section μm | Strut Thickness μm | Pore Morphology |
|---|---|---|---|---|---|---|
| P46 | 1.7 | 2390 | 0.64 | 0.5–8.0 | 0.5–1.0 | Connected |
| P35 | 1405 | 0 | 0.73 | 0.5–8.0 | 0.5–1.0 | Connected |

In the case of gel P46 (Table 4) $t_{BP}$, and $t_{DP}$ were 8.9 and 1.7 minutes, respectively. Gel P46 has an interconnected porous structure through $t_{DP}$ is only 1.7 minutes. This is because the significantly higher value of $t_{BP}$ (8.9 minutes compared to 2.0 minutes in samples P45, P75 and P76 of Table 3), allows significant crosslinking prior to phase separation and creates an incipient network. Since a part of the network is already established at the time of phase separation, a little time in the phase separated state allows the interconnected structure to become permanent.

EXAMPLE VI

Effect of Reaction Variables on Swelling

The main difference in the swelling of microporous gels from that of non-porous homogenous gels is that the water not only swells the polymer but also fills the pores. For convenience, the swelling of a microporous gel may be divided into two parts: "strut swelling" and "pore swelling". Pore swelling is filling of pores with water and the strut swelling may be similar to that of a non-porous gels. Water that fills up the interconnected pores can be removed by applying mechanical force. The water that fills closed pores can't be distinguished from the strut swelling. Thus, pore swelling depends up on the porosity of the gel, whereas the strut swelling approximately depends upon all the same variables that affect swelling of non-porous gels: degree of crosslinking, polymer—solvent interaction parameter, and degree of ionization.

Effect of Initial Polymer Concentration

The main effect of the initial polymer concentration on the microstructure of the microporous HPC gels with interconnected pores was a significant decrease in the porosity as the initial polymer concentration increased. As explained above, the equilibrium swelling degree of a microporous gel with interconnected pores is expected to increase with an increase in the porosity of the gel because the pore swelling increases. Thus, the equilibrium swelling degree of gels at room temperature decreases with increases in the initial polymer concentration due to decrease in the porosity of the gels (Table 5).

TABLE 5

Effect of Initial Polymer Concentration on
Equilibrium Swelling of Microporous HPC Gels.

Synthesis Parameters

Initial Polymer Concentration, $C_p$ = 9–22.6 wt %
Initial Crosslinker Concentration, $C_x$ – 1.3 to 2.1 wt %
Reaction Time Before Phase Separation, $t_{BP}$ = 1.5 to 2.2 minutes
Reaction Time During Phase Separation, $t_{Dp}$ = 23–24 hours
Reaction Time After Phase Separation, $t_{AP}$ = 0 minutes
Overall Reaction Time = about 24 hours

| Sample | $C_p$ wt % | Porosity | Degree of Swelling at Room Temp. | Strut Swelling at Room Temp. | Swelling Ratio at 60° C. |
|---|---|---|---|---|---|
| P24 | 9 | 0.76 | 9.35 | 2.7 | 1.4 |
| P16S1 | 12.8 | 0.69 | 7.09 | 2.2 | 1.25 |
| P20 | 16.4 | 0.54 | 5.37 | 2.5 | 1.22 |
| P38 | 22.6 | 0.23 | 4.41 | 3.4 | 1.18 |

The reaction time before phase separation was kept at a minimum and the reaction during phase separation was carried out for about 24 hours. This ensured complete crosslinking of the phase separated polymer concentration used for the synthesis.

The swelling ratio decreases with an increase in the initial polymer concentration. This is because the struts of microporous gels with lower initial polymer concentrations, may have local regions with relatively lower initial polymer concentration at the time of the formation of the network. For example, the struts of microporous gel with initial polymer concentration of 9 wt % may have regions with polymer concentration at the time of network formation varying from 9 wt % to 50 wt % whereas the struts of microporous gel with initial polymer concentration of 22 wt % will have regions with polymer concentration at the time of network formation varying from 22 to 50 wt %. The regions with relatively low initial polymer concentration will show relatively larger change in the equilibrium swelling degree with temperature. As a result, the gels with lower initial polymer concentration show larger volume changes and swelling ratios.

Figure 1:
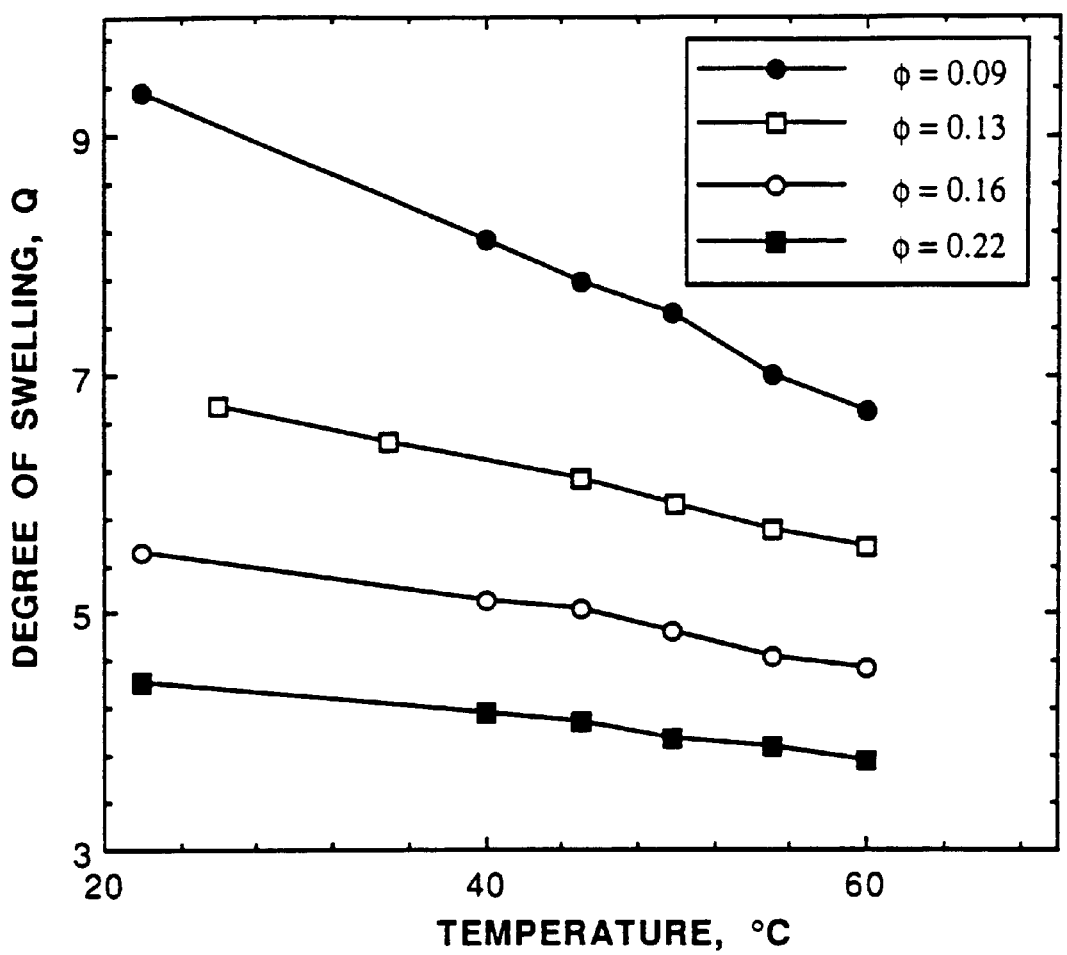
FIG. 1 is a graph of illustrating the effect of initial polymer volume fraction on the equilibrium swelling ratio of microporous gels as a function of temperature. Symbols refer to polymer volume fractions of 0.22, 0.16, 0.13 and 0.09, respectively.

These microporous gels show small, gradual changes in equilibrium swelling degree with temperature (FIG. 1). The equilibrium swelling degree at a given temperature is lower for gels with high initial polymer concentration due to the low porosity. The swelling ratio is larger for low initial polymer concentration due to the possibility of having regions with lower polymer concentrations at the time of network formation. It will be appreciated that the initial polymer concentration may be varied over a range greater than that described herein without departing from the scope of the invention.

Effect of Reaction Time Before Phase Separation

The reaction time before phase separation was varied to make microporous gels with different pore sizes as explained above. After phase separation, the reaction in the phase separated state was carried out for 24 hours for all these gels. The initial polymer crosslinker concentrations were fixed at 9 wt % and 1.6 wt %, respectively. We then studied the equilibrium swelling behavior of these gels. To better understand their equilibrium swelling behavior, these gels are divided in two classes: with interconnected pores and those without interconnected pores.

Figure 2:
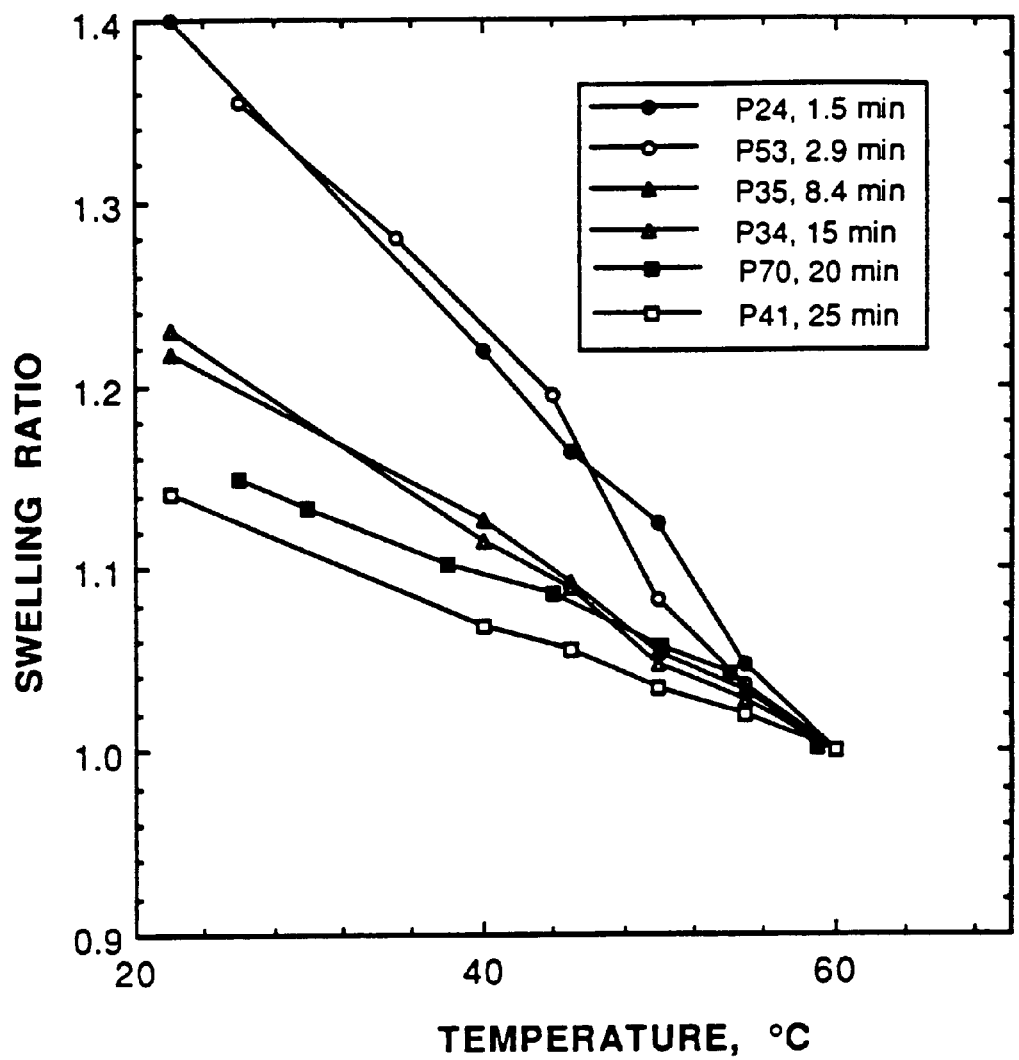
FIG. 2 is a graph illustrating the equilibrium swelling ratio as a function of temperature of microporous gels with crosslinking reaction times before phase separation less than gelation times.

When the initial polymer concentration is kept same for all the gels, the equilibrium swelling at room temperature is similar for those microporous gels having interconnected pores prepared at different reaction times before phase separation, $t_{BP}$ (range 9.4–11.1). The change in the equilibrium swelling ratio with temperature is small and gradual for these gels (FIG. 2). The reason for this behavior is the high and non-uniform polymer concentration at the time of network formation.

However, when the reaction time before phase separation is increased beyond gelation time, mostly non-porous gels are formed. Their swelling behavior is quite different from the microporous gels discussed earlier. Their equilibrium swelling degrees at room temperature are smaller than for gels with lower values of $t_{BP}$, other synthesis variables kept constant (range 5.9–8.8). Macroscopic shrinking of the network results in the increase in the average concentration of the polymer in the gel during the final stage of the synthesis which causes lower equilibrium swelling degree at room temperature.

During microsyneresis (phase separation within the sample), the polymer chains may arrange in regions with at least two different polymer concentrations, since the crosslinking reaction is not over at the time of phase separation. These regions with low and high polymer concentrations may get locked into the network and may be in equilibrium with each other at the synthesis temperature. As seen in FIG. 3, these gels with crosslinking reaction times before phase separation that are greater than the gelation time, show large and sharp change in volume near transition temperature just like a non-porous homogeneous gel with relatively low initial polymer concentration (polymer volume fraction between 0.09 and 0.15). However, their transition temperature is about 10 to 20° C. higher than that of homogenous gels. This difference in the transition temperature is most probably due to the presence of regions of different polymer concentrations inside the network. These regions are in equilibrium with each other at temperatures where homogeneous gel shrinks drastically. However, when the temperature is increased further, the equilibrium between these regions may be disrupted and a large change in the volume is observed probably due to the shrinking of regions with lower polymer concentration. This explanation is consistent with decrease in the transition temperature as $t_{BP}$ is increased. As $t_{BP}$ is increased much beyond gelation time, the network will tend to be more like a nonporous gel and will shrink much more at the time of increase in synthesis temperature into two-phase regions. As a result, its equilibrium swelling degree at room temperature will be lower, and the transition temperature will be closer to that of homogeneous gel.

Thus, the effect of reaction time before phase separation ($t_{BP}$) on the equilibrium swelling behavior depends upon whether $t_{BP}$ is lower than gelation time or higher than gelation time. When $t_{BP}$ is lower than gelation time, microporous gels with interconnected pores are obtained. These gels show small and gradual changes in volume with temperature as struts have lower equilibrium swelling degrees than homogeneous gels. The equilibrium swelling degrees of these gels are similar to one another at room temperature and are mostly dependent upon the initial polymer concentration. When $t_{BP}$ is higher than gelation time, the gels obtained are non-porous. They show large and sharp changes in volume near the transition temperature, similar to homogeneous gels. Their transition temperatures are higher than homogeneous gels as these gels may possess regions with different polymer concentrations which are in equilibrium with each other at temperature where homogeneous gel shows transition. Their equilibrium swelling degree at room temperature is lower as the average polymer concentration during synthesis rises due to macrosyneresis (shrinking) of the network at the time of phase separation.

Effect of Reaction Time During Phase Separation

All the microporous gels discussed previously had reaction times during the phase separated state ($t_{DP}$) on the order of 24 hours. Such a high $t_{DP}$ allowed enough time to completely lock in the phases which had separated upon temperature increase. Thus, the average polymer concentration of struts during synthesis was very high and the struts showed low swelling degree at room temperature and small changes in swelling degree with temperature. In order to obtain larger changes in the swelling volume with temperature, one must vary the reaction time during phase separation.

The kind of microstructure obtained varied strongly with $t_{DP}$. The equilibrium swelling behavior of gels with different values of tDP is given in FIG. 4. A large change in the volume is observed for gels with small $t_{DP}$ (1.5–3.8 min). These gels, however, have only partially connected pores. Because, the phase separation time ($t_{DP}$) was very small for gels P45, P75 and P76, after phase separation for this short period, lowering the crosslinking reaction temperature to room temperature caused remixing of the phase separated state. As a result, the polymer concentration in the struts at the time of synthesis didn't increase much and the polymer concentration at the time of network formation is rather uniform, unlike the microporous gels which may have regions of different polymer concentration at the time of network formation. The lower polymer concentration leads to a large change in the volume of the gel with temperature and the uniform polymer concentration leads to a sharp change in the volume of the gel near the transition temperature. The transition temperature of these gels is remarkably close to homogenous gels with polymer volume fraction of about 0.16.

Microporous gels with interconnected pores (P60 and P62) that have higher equilibrium swelling degrees and swelling ratios were prepared by keeping tDP just enough to get interconnected porous structure and by carrying out crosslinking reactions for the gelation time of HPC (60 minutes). The equilibrium swelling degree of these gels at room temperature is much higher than 10, (range 14.6–17.3), a value generally observed for other microporous HPC gels with the same polymer and crosslinker concentration. This higher value of equilibrium swelling degree was due to considerable swelling of the gel in water at room temperature after synthesis.

Figure 5:
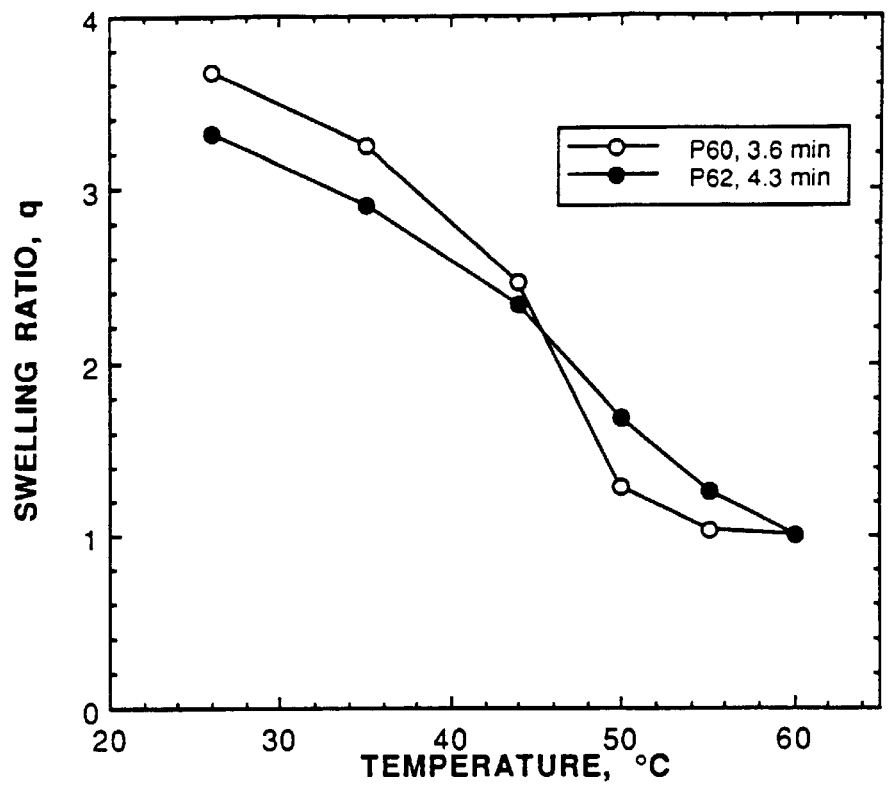
FIG. 5 is a graph illustrating the equilibrium swelling ratio as a function of temperature of open-celled microporous gels P60 and P62.

The strut swelling of these gels (P60 and P62) was considerably higher that the other microporous gels because of higher overall swelling and low $t_{DP}$. This higher strut swelling resulted in large volume change with temperature (FIG. 5). Since $t_{DP}$ was very low and the reaction temperature was immediately lowered after only a few minutes of phase separation, the polymer concentration in struts is still rather uniform. This uniform polymer concentration in the struts at the time of network formation caused a sharp change in the volume near the transition temperature.

Thus gels in which $t_{DP}$ is kept low show large strut swelling capacities and as a result they show larger changes in the volume with temperature. Also, the change in volume is sharp near the transition temperature. This is most probably due to a rather uniform polymer concentration in struts at the time of network formation. The microporous gels with interconnected pores which show large changes in volume near the transition temperature were prepared by keeping $t_{DP}$ high enough to obtain interconnected pores, but low enough to have high strut swelling capacities and by keeping overall crosslinking reaction time low enough to obtain higher equilibrium swelling degree at room temperature.

EXAMPLE VII

Effect of Microstructure on Kinetics

Figure 6:
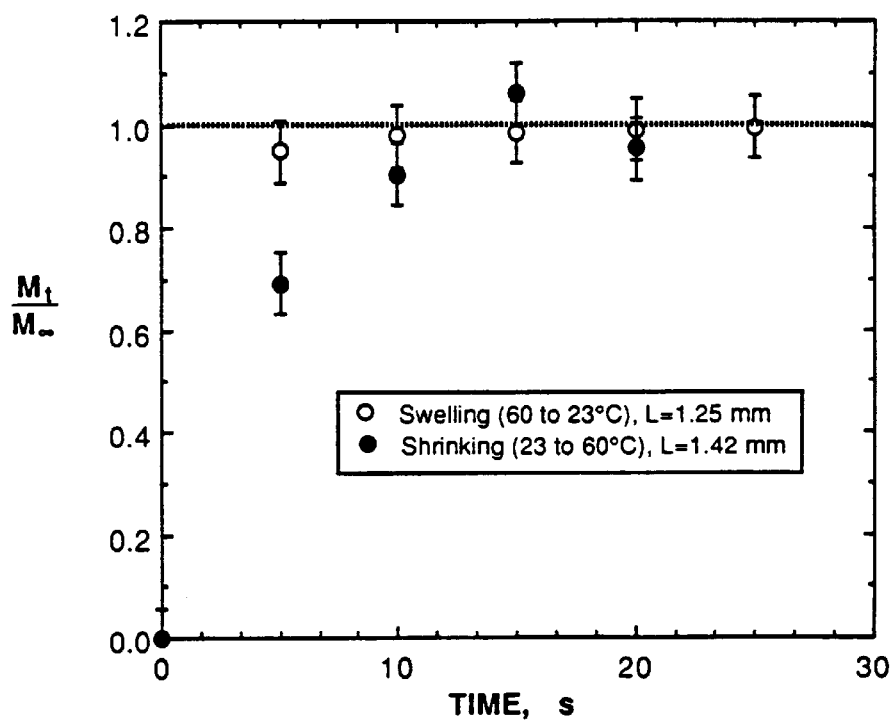
FIG. 6 is a graph illustrating the reversible volume change kinetics of microporous gel P46. L=initial sample thickness. Swelling and shrinking kinetics are normalized. $M_t/M_\infty$ is ratio of mass change at time 't' and total mass change as t approaches infinity (equilibrium).
Figure 7:
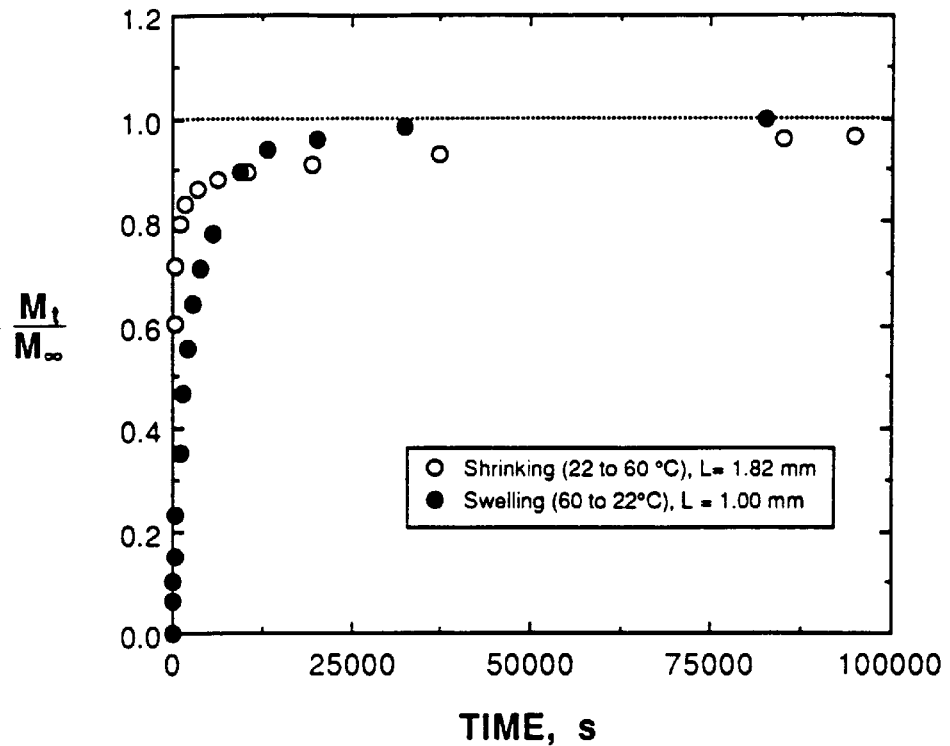
FIG. 7 is a graph illustrating the reversible volume change kinetics of non-porous gel P13S2. L=initial sample thickness.

Introduction: The volume change kinetics of gel P46 were measured using the equilibrium gravimetric technique and $M_t/M_\infty$ (fractional weight change) was plotted versus time in FIG. 6. In the form of a sheet nearly 1.5 mm thick, this gel takes less than 15 seconds to swell or shrink completely to equilibrium. In contrast, non-porous homogeneous HPC gel P13S2 of similar composition and dimensions takes several hours to shrink or swell completely to equilibrium, as shown in FIG. 7.

Gel sample P46 has a fractional uptake rate (rate of approach to equilibrium) several thousand times faster than the non-porous homogeneous HPC gel P13S2. Gel P46 also demonstrates our concept that a microporous gel with interconnected pores can have must faster volume change kinetics than homogenous gels.

The absolute volume change rate (mass per time) depends not only upon the rate of approach to equilibrium, but also upon the total change in volume (swelling ratio). The equilibrium swelling behavior of HPC gels described previously indicates that the observed volume change for non-porous gels is larger than that observed for microporous HPC gels due to a high polymer concentration at the time of network formation.

For an application in which cyclic change in the volume of responsive gel is exploited, the amount of solution processed in a given time may be more important than simply the rate of approach to equilibrium. Hence, the time taken to process a given change in volume was compared for a microporous gel with interconnected pores and a non-porous gel. Gel P46 was used an example of microporous gel with interconnected pores and a PNIPA gel which shows large change in volume (1140%) was used an example of non-porous gel (Lyu, "dewatering Fine Coal Slurries by Gel Extraction", M.S. Thesis, Univ. Cincinnati, 1990). As an example, the time taken for a gel to swell by 70% and then shrink back to original volume was calculated (the "cycle time"). For gel P46, the cycle time was 30 seconds. The cycle time taken for 70% volume change in the PNIPA gel was also calculated and ranged from 22 to 200 minutes.

Since not all applications would require large volume changes (for example, switches or actuators), even from an application standpoint microporous gels with interconnected pores are much better than non-porous gels.

Effect of Pore Size on Kinetics

The volume change kinetics of gels with different pore sizes and approximately constant porosity (0.77–0.69) were measured. The response times and diffusion coefficients determined from these data are given in Table 5. All these gels had interconnected pores.

TABLE 5

Effect of Pore Size on Collapse and Swelling of
Microporous Gels with Interconnected Pores.

Synthesis Parameters

Porosity: 0.69 to 0.77
Pore Size Range: 0.07 micron –0.5 micron to 0.5 micron–
9.0 micron
Response Time: (time to reach 98% of weight change/cm$^2$)
Collapse Time: time to reach 98% of equilibrium
Swelling Time: time to reach 98% of equilibrium

| Sample | Pore Size Cross-Section ($\mu$m) | Swelling Time (sec) | Collapse Time (sec) | Response Time (s/cm$^2$) |
|---|---|---|---|---|
| P24 | 0.5–9.0 | 20 ± 10 | 15 ± 5 | 800–1400 |
| P53 | 0.5–8.0 | 20 ± 10 | 15 ± 5 | 700–1500 |
| P35 | 0.5–8.0 | 20 ± 10 | 20 ± 5 | 1000–1200 |
| P34 | 0.25–3.0 | 20 ± 10 | 15 ± 5 | 900–1300 |
| P16S1 | 0.2–2.5 | 20 ± 10 | 15 ± 5 | 800–1200 |
| P70 | 0.07–0.5 | 20 ± 10 | 15 ± 5 | 600–900 |

The diffusion coefficients determined from volume change data during swelling did not change significantly as the pore size decreased from 0.5–9.0 micron to 0.07–0.05 micron because the rate of convection was always faster than the rate of heat transfer. This suggests that heat transfer plays a major part in determining the volume change kinetics. Convection may be playing a minor part as the swelling rate is slightly slower than the heat transfer rate. The response times during shrinking of these gels were about the same as the times needed to attain thermal equilibrium. Diffusion coefficients determined from volume change during shrinking are only slightly smaller than the thermal diffusivities of these gels. This means that volume change kinetics during shrinking is mostly limited by the rate of heat transfer.

Effect of Porosity on Kinetics:

Volume change kinetics of gels with interconnected pores having different porosities but similar pore sizes were studied. During shrinking, both diffusion coefficients and response times did not change much with porosity. (See Table 6) and heat transfer also plays a major role in determining volume change kinetics during shrinking.

TABLE 6

Effect of Porosity on Collapse and Swelling of
Microporous Gels with Interconnected Pores.

Synthesis Parameters

Porosity: 0.23 to 0.72
Pore Size Range: 0.05 micron –0.2 micron to 0.25 micron–
3.0 micron
Response Time: (time to reach 98% of weight change/cm$^2$)
Collapse Time: time to reach 98% of equilibrium
Swelling Time: time to reach 98% of equilibrium

| Sample | Pore Size Cross-Section ($\mu$m) | Swelling Time (sec) | Collapse Time (sec) | Response Time (s/cm$^2$) |
|---|---|---|---|---|
| P34 | 0.25–3.0 | 20 ± 10 | 15 ± 5 | 900–1300 |
| P16S1 | 0.2–2.5 | 20 ± 10 | 15 ± 5 | 800–1200 |
| P20 | 0.2–2.5 | 22 ± 10 | 15 ± 5 | 600–1000 |
| P38 | 0.2–2.0 | 30 ± 10 | 40 ± 10 | 1100–1500 |
| P41 | 0.05–0.2 | 35 ± 10 | 15 ± 5 | 600–1600 |

During swelling, diffusion coefficients and response times also did not change much with porosity. Heat transfer also plays a major role in determining volume change kinetics during swelling. Because of the role of heat transfer as response rate limiting, volume change kinetics in gels with interconnected pores do not change much with pore size and porosity for gels whose maximum pore size is greater than 0.2 micron and whose porosity is greater than about 0.5.

When pores are only partially connected or are non connected, convective flow will occur only through the interconnected pores. Solvent has to diffuse across the pore walls in order to be transported into or out of the unconnected pores. This results in an increase in the effective diffusion path length.

Figure 8:
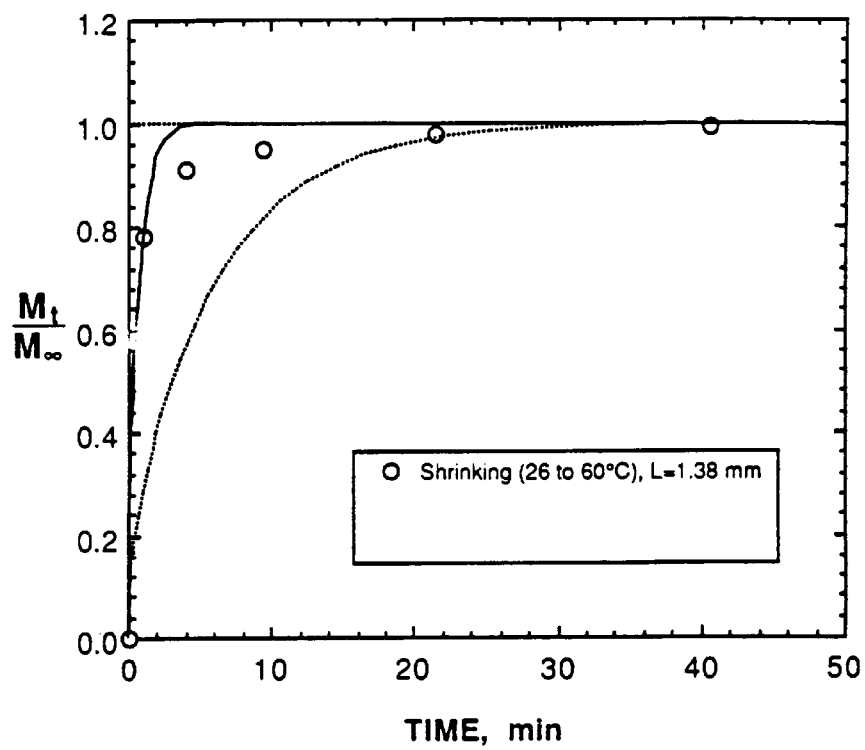
FIG. 8 is a graph illustrating the reversible volume change kinetics of gel P45 having microstructure intermediate between microporous and non-porous.

Gel P45 lies somewhere between a non-porous and interconnected structure. Volume change kinetics of P45 were studied using the dynamic gravimetric method. As shown in FIG. 8, the gel takes 40 minutes to shrink to equilibrium; about 160 times slower than microporous gels which take only 15–30 seconds to shrink. Gel P45 is still about 10 times faster than non-porous gels. Furthermore, the first 80% of the volume change occurred in 2 minutes, indicating the presence of some convective flow.

Gel P69 also has few connected pores but, unlike gel P45, the pores in P69 are very much smaller (0.03–0.15 micron) than those in P45 (3–8 um). Volume change kinetics of P69 are shown in FIG. 9 and are qualitatively similar to those of P45. The response time of P69 during shrinking is about 3 times longer that P45 and may be due to the fact that the pores in P69 are 100 times smaller.

DISCUSSION

A: Upper Bound of Volume Change Kinetics

During the volume change of a temperature sensitive gel, the rate of network motion and the rate of convection can be varied (or increased) by altering the gel microstructure. In contrast, the rate of heat transfer is not affected by the gel microstructure but is only a function of gel sample thickness if there is no convective heat transfer. Thus, for a given thickness of the gel the rate of heat transfer remains constant, while the rates of convection and network motion can be increased above the rate of heat transfer by altering the gel microstructure as shown herein. The rate of heat transfer becomes the slowest and thus rate-controlling step. This also means the upper bound of volume change rate of a temperature sensitive gel is given by the rate of heat transfer.

We then identified the conditions under which the rate of convection and the rate of polymer network motion are faster than the rate of heat transfer. The rate of convection depends upon the pore size and the porosity. For a microporous interconnected gel, the rate of convection is faster than the rate of heat transfer for gels with maximum pore size greater than 0.2 $\mu$m and porosity greater than 0.5; as well as gels with a porosity greater than 0.2 and maximum pore sizes greater than 2.0 um. Both the rate of convection and the rate of heat transfer vary inversely with the square of thickness. Hence the ratio of rate of convection to that of heat transfer should not change with the thickness. This means that the rate of convection will remain faster than the rate of heat transfer irrespective of gel thickness as long as the pores are interconnected and the pore size is greater than 0.2 $\mu$m for porosity greater than 0.5 or pore size is greater than 2.0 $\mu$m for porosity less than 0.5 but greater than 0.2.

The rate of network motion depends upon the mutual diffusion coefficient of pore wall and solvent and the strut thickness whereas the rate of heat transfer depends upon the thermal diffusivity and the gel thickness. For the rate of network motion to be faster than the rate of heat transfer, the following equation should be satisfied for a microporous gel with interconnected structure:

$$\frac{D_{\text{Heat Transfer}}}{(\text{Gel Thickness})^2} \leq \frac{D_{\text{Network Motion}}}{(\text{Strut Thickness})^2}$$

The minimum likely value of the diffusion coefficient for rubbery gels is $1 \times 10^{-7}$ cm$^2$/s. The rate of heat transfer for microporous HPC gels can be given by a thermal diffusion coefficient of $1 \times 10^{-3}$ cm$^2$s. Hence:

$$\frac{1 \times 10^{-3}}{(\text{Gel Thickness})^2} \leq \frac{1 \times 10^{-7}}{(\text{Strut Thickness})^2}$$

and thus,

Strut Thickness <0.01×(Gel Thickness)

Hence the requirements for the fastest possible volume change kinetics are:

1. The gel should have interconnected pores.
2. The gel thickness should be more than 100 times greater than the strut thickness.
3. The gel should have porosity greater than 0.5 and the maximum pore size greater than 0.2 $\mu$m. If the porosity is less than 0.5 but greater than 0.2, the maximum pore size should be greater than 2.0 $\mu$m.

B: Intermediate Volume Change Kinetics

The response rate may be obtained by altering the gel microstructure. If all the pores are interconnected, the volume change can be altered either by slowing down the rate of network motion or the rate of convection.

The rate of network motion can be slowed down by simply increasing the strut thickness. By increasing the strut thickness from 0.01 × gel thickness up to the gel thickness, the volume change kinetics can be varied from the fast extreme to the slow extreme. In the case of microporous HPC gels with interconnected pores, the strut thickness was always less than 0.01 × gel thickness, hence, the volume change kinetics could not be varied by changing the strut thickness.

The rate of convection can be decreased either by reducing the pore size of the porosity. However, it was found that for most HPC gels with interconnected pores, the pore size and porosity was always larger than what is required to decrease convection rate below the heat transfer rate.

Figure 4:
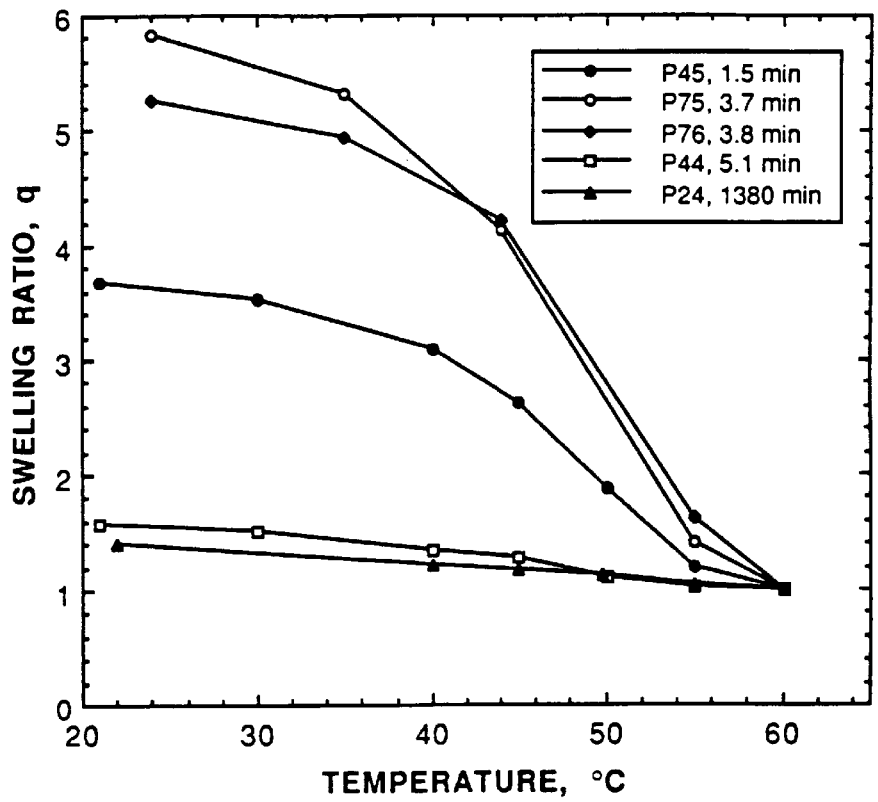
FIG. 4 is a graph illustrating the equilibrium swelling ratio as a function of temperature of microporous gels having different values of tDP.

The other possible alternative to reduce the volume change kinetics is to make gels with partially connected pores as observed for gels P45, P75, P76 and P69 (See FIGS. 4, 8, 9). When the pores were partially connected, the gel shrank quickly in the beginning due to convective flow through pores. However the shrinking rate slowed down at the end, most probably due to blocking of pores which may have stopped convection. This resulted in intermediate shrinking kinetics. However, it is difficult to quantify this. The swelling kinetics of these gels was slow as there was no convection.

EXAMPLE VIII

Volume Change Kinetics of Fast Response Gels Sensitive to Other Stimuli

Ionic Strength Sensitive Microporous Gels

As discussed above, the upper bound of volumetric kinetics of temperature sensitive fast response gels of the present invention is observed for gels with interconnected pores when polymer network motion and convection are faster than the rate of heat transfer. Similar results are expected with gels that undergo phase transitions induced by ionic strength.

Hydroxypropylcellulose gels of the present invention are also sensitive to ammonium sulfate concentration and the boundaries of volume change kinetics under these conditions was studied. The rate of stimulus change (i.e., ionic strength) was estimated from the diffusion coefficient of ions in the gels. Diffusion coefficients of ions and sulutes within the gel were estimated using the equations developed by Mackie and Meares, incorporated herein by reference. The diffusion coefficient of ammonium sulfate was estimated from the equations developed by Cussler, "Diffusion: Mass Transfer in Fluid Systems", Cambridge Univ. Press, Cambridge, 1984, incorporated herein by reference.

HPC gel P46 was collapsed by immersing gel swollen to equilibrium in water, into 1 M ammonium sulfate solution. Then, the gel sample was re-swollen in water. The polymer volume fraction in the collapsed and swollen states wa 0.26 and 0.11, respectively. By substituting these polymer volume fractions into the equations of Helfferich, ("Ion Exchange Kinetics", in Ion Exchange, Vol. 1, M. Dekker, NY, 1966), the diffusion coefficient of ammonium sulfate in the two phase transition gel states was estimated as $D_{shrunken}=9.8 \times 10^{-6}$ cm$^2$/sec and $D_{swollen}=5.2 \times 10^{-6}$ cm$^2$/sec.

The diffusion coefficient during swelling and shrinking changes as the polymer volume fraction changes. The coefficient applicable to the entire phase transition cycle was taken as the average of the two diffusion coefficients; $7.5 \times 10^{-6}$ cm$^2$/sec. Volume change kinetics of gel P46 in response to a change in external ammonium sulfate were measured using the videomicroscopy method described above. As seen in FIG. 10, this microporous gel responds about 50 to 100 times faster than what is expected for a non-porous gel. The time needed for polymer network motion was estimated to be about 0.1 seconds, much shorter than the time needed for the volume change and implies that polymer network motion does not limit the volumetric kinetics of this ionic strength sensitive gel. We also estimated that the time of water convection is also much smaller than the time for volume change. We suggest that the rate of stimulus change (i.e., the rate of ammonium sulfate transport in the gel) is the rate controlling step. Fastest swelling rates will be observed in highly microporous gels with large pore sizes. The collapse rate cannot be faster than ion diffusion.

Solvent Sensitive Microporous Gels

Gel P46 was swollen to equilibrium in water and was then collapsed by immersing the gel in acetone. Then the collapsed gel was re-swollen in water. The polymer volume fraction in the collapsed and swollen states were 0.14 and 0.11, respectively. Diffusion coefficients of solvents in the two gel states were calculated using the same equations as above. The average diffusion coefficient of solvents in gel P46 is $6.95 \times 10^{-6}$ cm$^2$/sec.

Kinetics of gel P46 sensitive to solvent were obtained using the dynamic gravimetric technique (Example I). Results are plotted in FIG. 11. Analysis of the diffusion coefficients obtained by fitting the data on volume change suggest that transport of non-solvent into or out of the gel controls the volume change kinetics. Behavior of this gel is similar to the ionic strength sensitive gels. It changes its volume 10–100 times faster than non-porous gels undergoing comparable changes.

CONCLUSIONS

Thermally sensitive microporous gels with interconnected pores have volume change kinetics many times faster than non-porous gels. Kinetics of gels with interconnected pores are much faster due to the convective flow of solvent through the interconnected pores. The pores have to be interconnected to allow this flow and hence, to obtain faster volume change kinetics. When the pores are unconnected, there can be no convective flow through them and volume change kinetics is controlled by the rate of network motion.

The volume change kinetics of microporous HPC gels with interconnected pores are generally determined by the rate of heat transfer. In contrast, the rate of convection has a smaller influence on the volume change kinetics. For most of the HPC gels with interconnected pores, the rate of heat transfer was always slower than the rate of convection.

Fast volume change kinetics is not a function of chemical nature or chemical composition of polymer but depends on microstructure of gel as demonstrated by microporous HPC and PNIPA gels with interconnected pores.

The upper bound on the volume change kinetics is the rate of heat transfer and is observed in microporous gels with interconnected pores. Intermediate volume change kinetics was observed when the pores were partially connected, and in principle could be observed for microporous gels with strut thickness greater than 0.01 times gel thickness, but less than the gel thickness.

USES

Fast response microporous gels of this invention may be used with advantage in a number of applications.

Separations/dewatering: One use that is well-suited to the present gels is that of excluding dissolved or particulate solutes from a solvent and/or extracting and/or concentrating solvents, provided that molecules are large enough so that they do not permeate the pores of the gels or are excluded therefrom by other mechanisms, such as charge effects. See, for example U.S. Pat. No. 4,863,613 (Johnson et al.) and U.S. Pat. No. 4,555,344 (Cussler), incorporated herein by reference. Adaptation of the basic methodology described in these patents to the present fast response gels involves adding a solution containing a particular solute (i.e., a high molecular weight protein or particles suspended in the solution) to a collapsed, microporous fast response gel of the present invention such as, for example gel P46 (FIG. 6). This gel is cooled so that it expands in a phase transition to absorb solvent and small solutes but does not absorb high molecular weight solutes such as proteins. Phase transition expansion occurs within 30 seconds. The swollen gel and unabsorbed solution are separated from each other. The unabsorbed solution may be subjected to further treatment with another fast response gel in order to concentrate the high molecular weight solute.

Since the gels of the present invention very rapidly recycle between swollen and collapsed states (see FIG. 6, for example) the microporous gel swollen with solvent and small solutes may be warmed so that it will rapidly undergo a phase transition collapse (within 30 seconds) to release the absorbed solvent. In addition, just prior to phase transition collapse, the swollen gel may be washed with solution to yield a wash solution that is combined with the unabsorbed solution. This combined solution may be further subject to fast response gel treatment, as above.

Further applications in this field include dewatering slurries in process streams. The slurries or solution can be dewatered very quickly, improving economies. For example, when oil and gas wells are drilled using conventional procedures, liquids are circulated down the drill string and out the drill bit at the lower end of the drill string. These liquids are then circulated back up through the bore to the surface. These drilling liquids, also called "mud", contain cuttings such as clays generated during drilling and need to be passed through a variety of control equipment in order to remove solids. Conventionally, the largest solids are removed by shakers and cyclones. Nevertheless, fine particles will continue to move through the recirculating drilling liquids and the difficulty in removing these particles will increase as the size of the particles decrease. Larger sized particles, greater than about 20 microns in diameter, can be removed by centrifugation. Lower-sized particles are typically removed by adding coagulants and flocculating agents to the muds. These materials enhance the centrifugation process. The water recovered after centrifugation is returned to the aqueous drilling liquids and separated solids are discharged.

Gel polymers have been used to remove water from the drilling mud, thus reducing the amount of water in the solids at discharge. The dewatered solids are removed as paste. See, for example, Huang et al. U.S. Pat. No. 5,258,123, incorporated herein by reference. The present microporous, fast response, reversibly responsive gels are designed to operate in these environments, as well as in food processing to separate proteinaceous material from a liquid. Bioseparations are another application in which the present fast response gels are useful, for example the separation of a freely soluble drug from a fluid. In other embodiments, the present fast response polymer gels are introduced to a coal slurry containing suspended solute. Solvent is selectively absorbed by the fast response polymer and the coal-laden remaining in solution is separated from the solvent-laden fast response gel. The present gels may also be used to separate solvent (mainly water) from suspended sludge in sewage treatment facilities, or to separate dissolved ink from solvent in paper pulp waste generated by paper-making procedures, or separate dissolved or suspended solutes from solvents in chemical process waste streams, or separate solutes from seawater.

Drug delivery systems: It has been well documented that materials such as hydroxylalkylmethacrylate hydrogels have the ability to swell in water or aqueous solvent systems. See, for example, Kim et al., Pharm Res., 9: 283–290 (1992), incorporated herein by reference. Because the swelling level of these materials can be easily manipulated, the permeability of solute within the gel can also be regulated. Release of drugs from these hydrogels involves absorption of liquid into the gel and desorption of drug via diffusion. The present fast response gels may be applied to this technology by surrounding a bioactive material with a microporous, fast response gel membrane whose absorptive capacity in water, and thus its permeability to water and the bioactive material, can be reversibly controlled by changing the environment of the membrane. When placed in an aqueous environment in a collapsed condition, the device will be nearly inert as long as the permeability of the membrane remains low. Once the appropriate environmental change is applied (i.e., a temperature change), the membrane is rapidly expanded and permeability is increased. Pulsed drug delivery or release of a drug from an osmotic pump are also well known. The release rate from an elementary osmotic pump may be modulated with a microporous, fast response gel of the invention disposed in the release orifice. Alternately, the osmotic pump mechanism may be eliminated entirely and reversibly responsive gels of the invention will release drug from a reservoir (i.e. the pores themselves) as quickly as a stimulus signal is received.

Liquid/vapor dehumidification/absorption

The present fast response gels may be applied as a gel-based vapor extraction apparatus and method.

An exemplary apparatus for extracting vapor from a gas stream includes a microporous, reversibly responsive, fast response gel of the invention that is capable of sorbing vapor as a liquid when exposed to a first environmental condition and capable of disgorging the liquid when exposed to a second environmental condition. In some cases, the fast response gel is moved by way of a housing from a first position, where it is exposed to a gas stream and exposed to a first environmental condition (i.e., a first temperature), and then to a second position, where it is exposed to a second environmental condition (i.e., a second temperature). The first environmental condition may allow for sorption of the vapor and rapid expansion of the gel and the second environmental condition causes the gel to rapidly collapse and disgorge the liquid. The fast response gel can also be an interpenetrating network of two or more polymers whose rapid and reversible responsiveness is initiated by a change, relative to the first environmental condition, in at least one of temperature, pH, solvent concentration and ion concentration. The housing may be a thin disk having perforations defined in it for holding the fast response gel. In another embodiment, the housing can be a disk having many gel-lined cells defined in it that are arranged in a honeycomb configuration. See, for example, U.S. Pat. No. 3,140,936, incorporated herein by reference.

A dehumidification method of the present invention includes providing a reversibly responsive, fast response gel having sufficient flexibility in its microstructure so that it can sorb vapor as liquid and expand in volume. Next, the fast response gel is exposed to a change in an environmental conditions sufficient for the fast response gel to rapidly collapse and disgorge liquid from the gel. Preferably, the fast response gel is provided in a moveable housing that contains the fast response gel and moves it between first and second environmental conditions sufficient for the fast response gel to sorb vapor as liquid and then undergo a collapse and disgorge liquid from the gel.

Generally, a fast response is desired for a large majority of the applications which have been previously proposed for responsive gels. Thus, this invention will enhance performance, make performance practical, or improve the economics of almost all responsive gel applications. Applications enhanced by use of this invention further include: sensors or mechanical switches (response time is greatly reduced) and artificial muscles (expansion or contraction will occur quickly to drive a mechanism).

EQUIVALENTS

The invention has been described with reference to various specific and preferred embodiments and techniques. However, it should be understood that many variations and modifications may be made while remaining within the spirit and scope of the invention.

We claim:

1. A microporous, fast response, cross-linked gel obtained from a polymeric precursor, the gel of sufficient flexibility to enable said gel to be reversibly responsive to change in an environmental condition, wherein said polymeric precursor is a cellulose ether.

2. The microporous gel of claim 1, wherein said cellulose ether is selected from the group consisting of methylcellulose, hydroxypropylmethylcellulose, hydroxypropylcellulose, hydroxyethylcellulose, carboxymethylcellulose and hydroxymethylcellulose.

3. The microporous gel of claims 1 or 2, wherein said gel has a pore size ranging from about 0.005 to 50.0 microns and a strut thickness ranging from about 0.005 to 50.0 microns.

4. The microporous gel of claim 1, wherein the gel is physically-crosslinked.

5. The microporous gel of claim 1, wherein the gel is a component of an interpenetrating polymer network.

6. The microporous gel of claim 1 having a pore size of no greater than 10 microns.

7. A method of making a microporous, reversibly responsive gel, comprising:

preparing a polymer solution having a certain initial concentration of a polymer precursor which is a cellulose ether;

initiating phase separation of the polymer to produce a phase separated state;

crosslinking the polymer in its phase separated state for a certain crosslinking reaction time to produce a gel with a microstructure having sufficient flexibility to be reversibly responsive to a change in an environmental condition; and allowing gelation to be completed.

8. The method of claim 7, wherein the step of crosslinking the polymer comprises photochemically crosslinking the polymer.

9. The method of claim 7, wherein if the polymer is chemically crosslinked, then the step of crosslinking further comprises chemically crosslinking the polymer prior to its phase separated state.

10. The method of claim 7, wherein the step of initiating phase separation comprises the step of increasing temperature of said polymer from below a lower critical solution temperature to above the lower critical solution temperature.

11. The method of claim 7, further comprising adjusting at least one variable selected from the group consisting of initial polymer concentration and crosslinking reaction time during phase separation.

12. The method of claim 11, comprising adjusting the initial polymer concentration by increasing said concentration so that said microporous gel has a decreased porosity relative to a microporous gel in which said initial polymer concentration is not increased.

13. The method of claim 9, further comprising adjusting the crosslinking reaction time prior to phase separation by increasing said reaction time, so that said microporous gel has a pore size and strut thickness that are decreased relative to a microporous gel in which said crosslinking reaction time prior to phase separation is not increased.

14. The method of claim 11, comprising adjusting the crosslinking reaction time during phase separation by increasing said time, so that said microporous gel has pores that are more interconnected relative to a microporous gel in which said crosslinking reaction time during phase separation is not increased.

* * * * *